US007107534B1

(12) United States Patent
de Jong et al.

(10) Patent No.: US 7,107,534 B1
(45) Date of Patent: Sep. 12, 2006

(54) STORAGE AREA NETWORK ADMINISTRATION

(75) Inventors: Anke T. de Jong, Menlo Park, CA (US); Larry L. Cornett, Campbell, CA (US); David A. Holzer, San Jose, CA (US); John G. DeBriere, San Jose, CA (US); Peter J. Nicklin, San Jose, CA (US); R. Michael Reese, Aurora, CO (US); Valerie E. Fife, Colorado Springs, CO (US); Johnny C. Nichols, Dallas, TX (US); Chooi P. Low, Dallas, TX (US); Kit Fitzpatrick, Fremont, CA (US)

(73) Assignee: Adaptec, Inc., Milpitas, CA (US)

( * ) Notice: Subject to any disclaimer, the term of this patent is extended or adjusted under 35 U.S.C. 154(b) by 402 days.

(21) Appl. No.: 09/275,727

(22) Filed: Mar. 24, 1999

Related U.S. Application Data

(60) Provisional application No. 60/079,212, filed on Mar. 24, 1998.

(51) Int. Cl.
*G06F 3/00* (2006.01)
*G06F 9/44* (2006.01)

(52) U.S. Cl. ..................... 715/734; 715/969; 715/735; 715/736; 715/835; 715/771

(58) Field of Classification Search ............... 707/206; 709/224, 223; 710/100; 345/734, 735, 736, 345/771, 969, 839, 835, 967, 966
See application file for complete search history.

(56) References Cited

U.S. PATENT DOCUMENTS

| | | | | |
|---|---|---|---|---|
| 5,829,053 A | * | 10/1998 | Smith et al. | 711/202 |
| 5,890,204 A | * | 3/1999 | Ofer et al. | 711/111 |
| 6,009,466 A | * | 12/1999 | Axberg et al. | 709/220 |
| 6,098,119 A | * | 8/2000 | Surugucchi et al. | 710/10 |
| 6,151,620 A | * | 11/2000 | Madsen et al. | 709/204 |
| 6,263,350 B1 | * | 7/2001 | Wollrath et al. | 707/206 |

(Continued)

OTHER PUBLICATIONS

P. Massiglia, *"The RAID Book"*, 6th Ed., © RAID Advisory Board, Feb. 1997.

(Continued)

*Primary Examiner*—Ba Huynh
*Assistant Examiner*—Mylinh Tran
(74) *Attorney, Agent, or Firm*—Martine Penilla & Gencarella, LLP

(57) ABSTRACT

A storage area network management and configuration system is provided. The system includes an enterprise network that has a plurality of computer systems, and some of the plurality of computer systems include a server component, some include a client component, and some include both the client component and the server component. The system also includes a storage enclosure that is connected to a computer system having at least the server component. A graphical user interface window is provided by the client component, and the graphical user interface provides a graphical representation and icon links to configuration tools for controlling the drives and arrays of the storage enclosure. In one aspect, the enterprise network can include a plurality of storage enclosures that are connected to selected computer systems that are part of the enterprise network and that have the server component. Through the configuration tools, any one of the drives in the storage enclosures can be configured into a particular RAID-based array, monitored for failures, and modified to meet different storage needs. The modification can, in one aspect, be performed by simply dragging configuration template icons over selected hardware storage devices.

17 Claims, 29 Drawing Sheets

U.S. PATENT DOCUMENTS 6,266,721 B1 * 7/2001 Sheikh et al. .............. 710/100
6,269,397 B1 * 7/2001 Pirhonen .................... 709/223
6,269,398 B1 * 7/2001 Leong et al. ............... 709/224

OTHER PUBLICATIONS

P. Massiglia, *"What's RAID"*, © 1997-8 Advanced Technology and Systems Co., www.adtx.co.jp/english/raid/raid0.html.

P. Massiglia, *"The Basics of RAID Technology"*, pp. 1-3, © 1997-8 Rising Edge Technologies, Inc., www.rising-edge.com/industry/overview/raid/index.html.

M. Blaum et al., *"EVENODD: An Efficient Scheme for Tolerating Double Disk Failures in RAID Architectures"*, pp. 192-201, 1994 IEEE Transactions on Computers, vol. 44, No. 2.

* cited by examiner

STORAGE AREA NETWORK ADMINISTRATION

CROSS REFERENCE TO RELATED APPLICATIONS

This application claims priority from U.S. Provisional Patent Application No. 60/079,212, filed Mar. 24, 1998, and entitled "Software System For Administration of Storage Resources of a Computer Network." This provisional application is herein incorporated by reference.

BACKGROUND OF THE INVENTION

1. Field of the Invention

This invention relates generally to storage area networks, and more particularly to systems for configuring and managing storage devices connected over a network.

2. Description of the Related Art

As the need for reliable storage solutions increase across a company network, computer network and storage experts have been designing network solutions that incorporate one or more redundant array of inexpensive disks (RAIDs). RAID is a storage technology wherein a collection of multiple disk drives is organized into a disk array managed by a common array controller. The array controller presents the array to the user as one or more virtual disks. Disk arrays are the framework to which RAID functionality is added in functional levels to produce cost-effective, highly available, high-performance disk systems.

Although RAID provides the reliability network administrators are looking for, setting up a disk array to work in accordance with a given RAID level is not always straight forward for a network or computer administrator having a typical level of RAID experience. For instance, RAID level 0 is a performance-oriented striped data mapping technique. Uniformly sized blocks of storage are assigned in a regular sequence to all of the disks in the array. RAID 0 provides high I/O performance at low cost. Reliability of a RAID 0 system is less than that of a single disk drive because failure of any one of the drives in the array can result in a loss of data.

RAID level 1, also called mirroring, provides simplicity and a high level of data availability. A mirrored array includes two or more disks wherein each disk contains an identical image of the data. A RAID level 1 array may use parallel access for high data transfer rates when reading. RAID 1 provides good data reliability and improves performance for read-intensive applications, but at a relatively high cost.

RAID level 2 is a parallel mapping and protection technique that employs error correction codes (ECC) as a correction scheme, but is considered unnecessary because off-the-shelf drives come with ECC data protection. For this reason, RAID 2 has no current practical use, and the same performance can be achieved by RAID 3 at a lower cost. As a result, RAID 2 is rarely used.

RAID level 3 adds redundant information in the form of parity data to a parallel accessed striped array, permitting regeneration and rebuilding of lost data in the event of a single-disk failure. One stripe unit of parity protects corresponding stripe units of data on the remaining disks. RAID 3 provides high data transfer rates and high data availability. Moreover, the cost of RAID 3 is lower than the cost of mirroring since there is less redundancy in the stored data.

RAID level 4 uses parity concentrated on a single disk to allow error correction in the event of a single drive failure (as in RAID 3). Unlike RAID 3, however, member disks in a RAID 4 array are independently accessible. Thus RAID 4 is more suited to transaction processing environments involving short file transfers. RAID 4 and RAID 3 both have a write bottleneck associated with the parity disk, because every write operation modifies the parity disk.

In RAID 5, parity data is distributed across some or all of the member disks in the array. Thus, the RAID 5 architecture achieves performance by striping data blocks among N disks, and achieves fault-tolerance by using 1/N of its storage for parity blocks, calculated by taking the exclusive-or (XOR) results of all data blocks in the parity disks row. The write bottleneck is reduced because parity write operations are distributed across multiple disks.

The RAID 6 architecture is similar to RAID 5, but RAID 6 can overcome the failure of any two disks by using an additional parity block for each row (for a storage loss of 2/N). The first parity block (P) is calculated with XOR of the data blocks. The second parity block (Q) employs Reed-Solomon codes.

As can be appreciated, even the most knowledgeable computer administrators are required to have a good working understanding of RAID and the ability to select the correct hardware to make the storage solution work. To facilitate this, some companies provide preconfigured RAID arrays, which can be connected to a computer system, such as, a server computer or a cluster. Although the these RAID solutions provide good data storage reliability, a computer technician/administrator is required to initially configure the RAID solution on a system and then continually monitor its health over its lifetime.

For instance, once the RAID solution is correctly configured, the computer technician/administrator should plan on making trips to the server so that the health of each of the individual disks in the RAID solution can be monitored. This is generally required because RAID solutions, by their very nature, will not completely fail when only one of the disks stop working. However, if more than one disk fails, the RAID solution may be unable to guard against data loss. Although this might not appear to be a big task, as the company enterprise networks continues to expand, there may be a need for multiple RAID solutions at each server computer (i.e., server or cluster). As a result, there will be an ever growing need to configure RAID solutions, monitor the health of each RAID solution and repair and/or rebuild RAID solutions as the storage needs of the company grow and change.

In view of the foregoing, there is a need for an easy-to-use system for configuring, managing, and monitoring RAID storage systems over a network.

SUMMARY OF THE INVENTION

Broadly speaking, the present invention fills these needs by providing a system and method for configuring, administering and managing storage resources that are shared in a network environment. It should be appreciated that the present invention can be implemented in numerous ways, including as a process, an apparatus, a system, a device, a method, or a computer readable medium. Several inventive embodiments of the present invention are described below.

In one embodiment, a storage area network management and configuration system is disclosed. The system includes an enterprise network that has a plurality of computer systems, and some of the plurality of computer systems include a server component, some include a client component, or both the client component and the server component. The system also includes a storage enclosure that is connected to a computer system having at least the server component. A graphical user interface is provided by the client component, and the graphical user interface provides a graphical representation and icon links to configuration tools for controlling the storage enclosure. In this embodiment, the enterprise network can include a plurality of storage enclosures that are connected to selected computer systems that are part of the enterprise network and that have the server component. Through the configuration tools, any one of the available drives in the storage enclosures can be configured into a particular RAID-based array, monitored for failures, and modified to meet different storage needs.

One example of the graphical representation and icon links include an array builder link. The array builder link, when selected, provides selection tabs to allow array building from an array template or from scratch. When the array is built from the template, a template icon can simply be dragged onto array hardware that is selected to receive the configuration.

The graphical user interface provided by the client software will thus enable a user to easily modify any of the disk arrays connected to the enterprise network, monitor all of the storage enclosures and selected disks connected to the storage enclosures, build specific RAID array configurations, and be alerted by an event notifier of when a problem is detected with a particular storage enclosure or a particular disk that is nested within a particular storage enclosure.

In another embodiment, a storage area network system is disclosed. The system includes a server computer system that is connected to an enterprise network. Further included is a storage enclosure that is connected to the server computer system. A client computer system having a graphical user interface control is also provided for enabling a user to remotely configure drives of the storage enclosure. Preferably, the graphical user interface control includes one or more of an array modifier icon link, an enterprise monitor icon link, an array builder icon link, an event notifier icon link, an unconfigured hardware icon link, a templates icon link, and an enterprise icon link.

In yet a further embodiment, a standalone storage enclosure is used to house the RAID-based disk arrays. The storage enclosure of the present invention, preferably includes dual power supplies, dual fans, one or two hardware RAID controllers, environmental sensing and monitoring devices, and associated configuration hardware. Preferably, the drives that make up the RAID-based disk arrays are hot pluggable via SCA connectors. This provides the advantage of not necessitating additional interconnect cabling within the storage enclosure. To provide high bandwidth communication links between the storage enclosures of an enterprise, high speed communication interconnect technology is implemented. In one embodiment, the interconnect technology implements Fibre Channel interconnects and Fibre Channel hubs.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for a system and method for configuring, administering and managing storage resources that are shared in a network environment. It will be obvious, however, to one skilled in the art, that the present invention may be practiced without some or all of these specific details. In other instances, well known process operations have not been described in detail in order not to unnecessarily obscure the present invention.

In one embodiment, an easy-to-administer hardware and software storage solution for use with computer server systems (or clusters) is provided. The software allows users to easily configure, manage, and monitor RAID-based disk arrays in an Enterprise. As used herein, an enterprise may include an example company which may have several server computer systems and RAID-based disk arrays resident at selected ones of the several computer systems.

In another embodiment, a standalone storage enclosure can be used to house the RAID-based disk arrays. The storage enclosure of the present invention, preferably includes dual power supplies, dual fans, one or two hardware RAID controllers, environmental sensing and monitoring devices, and associated configuration hardware. Preferably, the drives that make up the RAID-based disk arrays are hot pluggable via SCA connectors. This provides the advantage of not necessitating additional interconnect cabling within the storage enclosure.

The embodiments of the present invention also enable environmental monitoring of the storage enclosures that are connected over the network. For instance, the environmental monitoring may include monitoring the temperature, monitoring fan operation, monitoring power supply operation, monitoring drive insertion and removal, and general enclosure health with regard to performing system I/O for customer applications.

The software functional implementation is preferably based on a client-server model, and includes a variety of features for allowing system administrators to remotely configure and monitor RAID arrays, controllers, and associated subsystem components. In a preferred embodiment, there can be multiple administration systems on an enterprise network backbone, and each administration system can see all other servers, and each server can have multiple storage enclosures. The client software, when loaded onto a computer of the enterprise, provides the user the power to administer storage enclosures connected to servers having the server component.

Figure 1A:
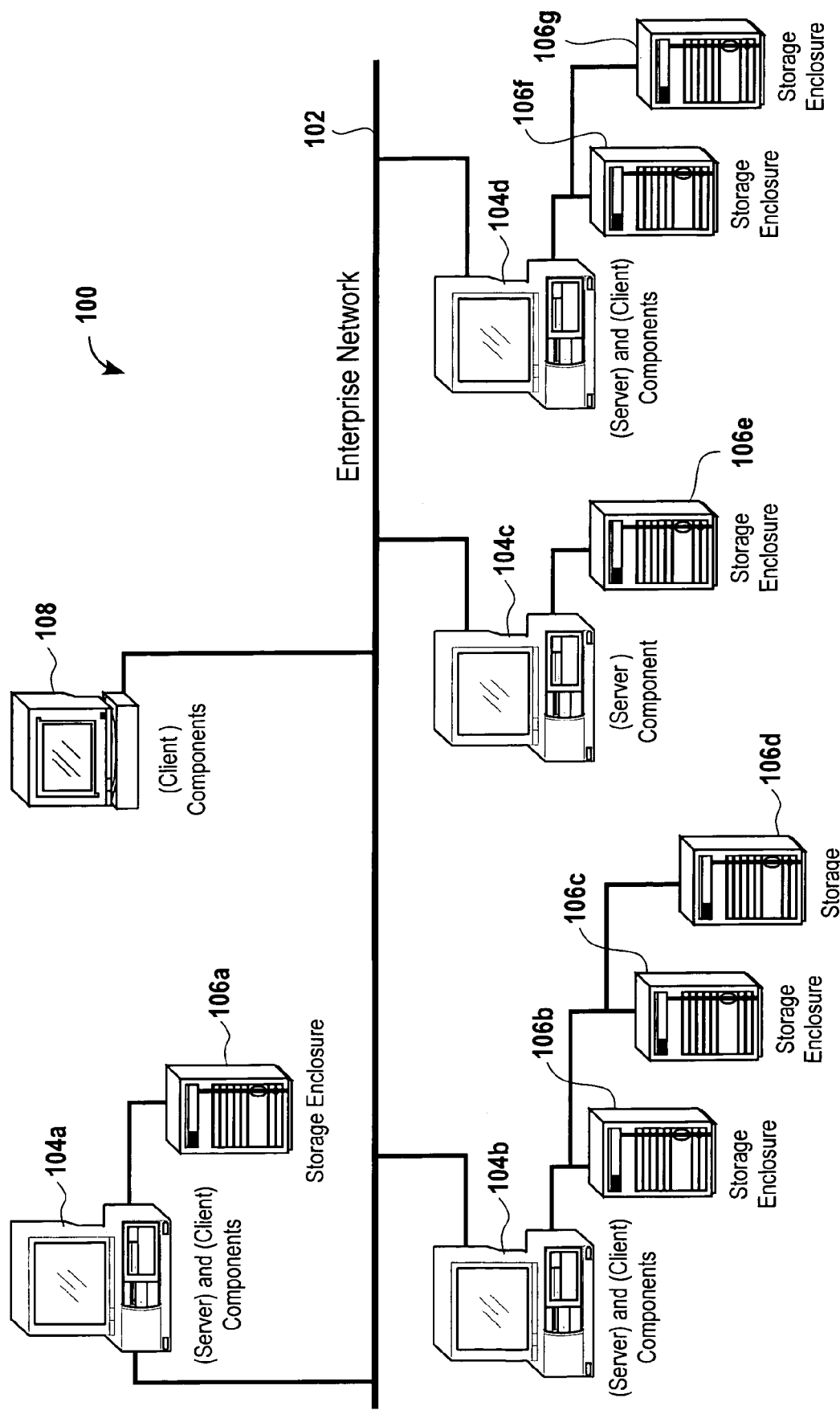
FIG. 1A illustrates a computer block diagram of an enterprise network, in accordance with one embodiment of the present invention.

FIG. 1A illustrates a computer block diagram 100 of an enterprise network, in accordance with one embodiment of the present invention. As shown, the enterprise network 102 may have a plurality of server computer systems 104a through 104d. Typically, each of the server computer systems 104, may serve to provide access to groups of users in the enterprise and to share data stored on those computer systems (or clusters). As is well known, a cluster is a collection of two or more independent servers that are able to access a common body of data storage and provide services to a common set of clients. In this embodiment, the server computer systems may have one or more storage enclosures 106a through 106g which serve to house a plurality of hard disk drives. The storage enclosures, as used herein, are preferably RAID-based disk arrays.

Also shown connected to the enterprise network 102 is a client computer 108. The method by which the hardware and software control the various RAID-based disk arrays in the enterprise will be described with reference to the following figures. Most preferably, the software used to administer the RAID-based disk arrays will be in the form of a server component and a client component. For instance, if the storage administrator desires to configure, monitor, or service one of the storage enclosures connected to one of the server computer systems on the enterprise network 102, the administrator can simply log on to any computer having the client component.

In this embodiment, the administrator can administer any of the storage enclosures in the enterprise network 102 via any computer having the client component software. In this example, server computers 104a, 104b, 104d, and 108 all have the client component. Accordingly, the client component will allow the administrator to log-on to the enterprise network through the easy-to-use graphical user interface of the present invention and administer any of the storage enclosures. In the enterprise network, the server computers having associated storage enclosures that are desired to be managed by the software administration system of the present invention, should have the server component of the software.

The server component of the software will essentially allow the server computer to intelligently communicate to the various storage enclosures connected thereto. By way of example, server computer 104b will have the server component which will enable it to share and make accessible the storage enclosures 106b, 106c, and 106d to the enterprise network. In a similar manner, server computers 104c, 104d, and 104a all include the server component of the software that will enable the enterprise network to see the various storage enclosures connected to those server computers. Accordingly, the system administrator can now log-on to any computer having the client software and gain access to the enterprise network and monitor, configure, and service any of the storage enclosures including any of its individual hard drives from the client environment.

In a further embodiment, the graphical user interface provided by the client software will enable a user to easily modify any of the disk arrays connected to the enterprise network, monitor all of the storage enclosures and selected disks connected to the storage enclosures, build specific RAID array configurations, and be alerted by an event notifier of when a problem is detected with a particular storage enclosure 106 or a particular disk that is within a particular storage enclosure.

Figure 1B:
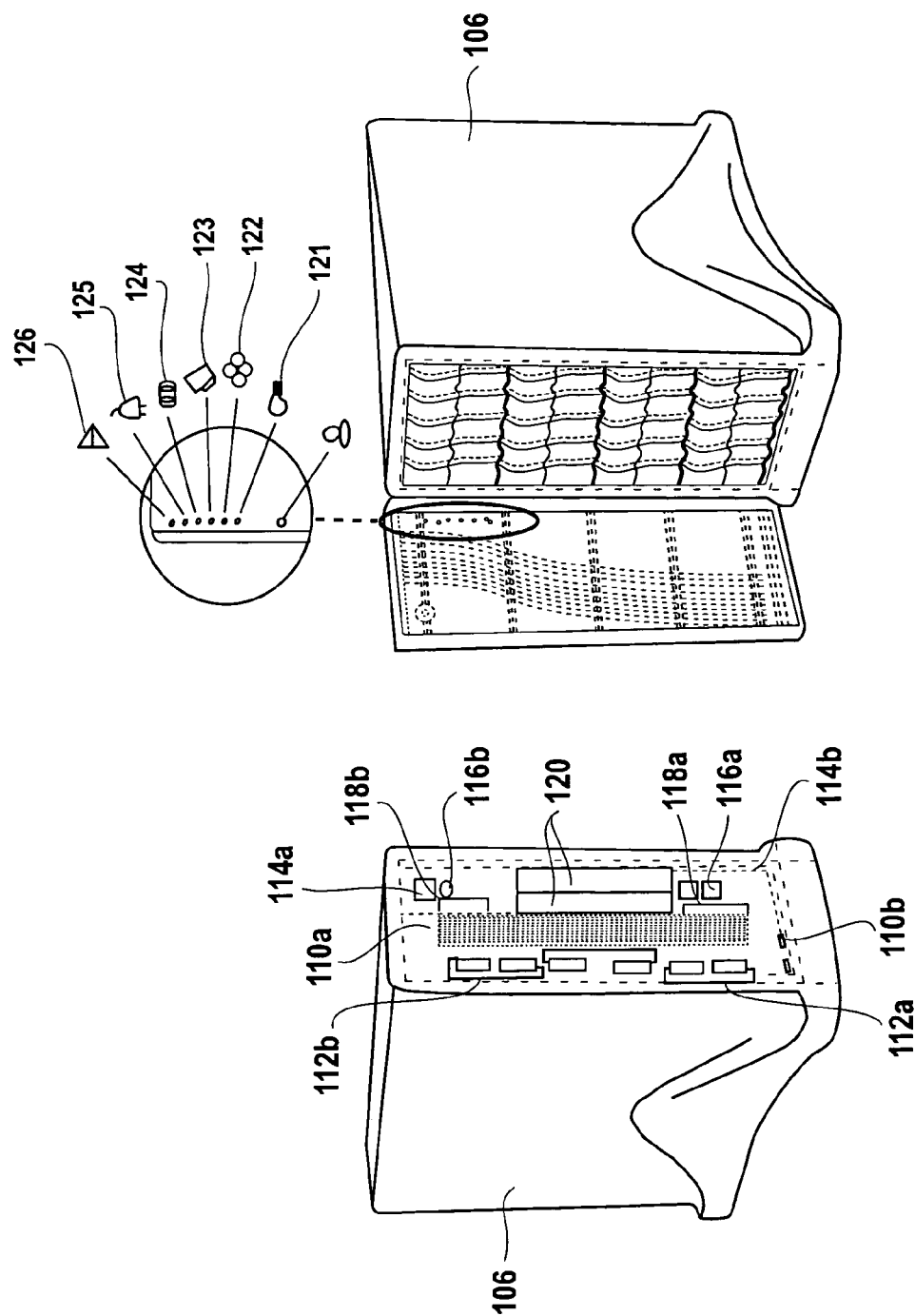
FIG. 1B illustrates an exemplary embodiment of the storage enclosure in accordance with the invention.

FIG. 1B illustrates an exemplary embodiment of the storage enclosure 106 in accordance with the invention. As mentioned above, the storage enclosure includes first and second fans 110a and 110b, dual power supplies 114a and 114b, and preferably one or two hardware RAID controllers 120. As shown, the storage enclosure also includes AC power connectors 118a and 118b, and associated power switches 116a and 116b. On the front door of the storage enclosure 106, a number of indicator lights/icons 121–126 are provided. The example indicators include a temperature indicator 121, a fan indicator 122, a controller indicator 123, a driver indicator 124, a power supply indicator 125 and a general fault indicator 126. Of course, these indicators are merely exemplary in nature, and other indicators and icons can also be used to quickly provide a user an overview of the storage enclosure's operation.

In the embodiment shown, 20 hard disk drives are provided. By way of example, if 20 hard disk drives are provided, they may be 20 1-inch wide drives. If 12 hard disk drives are provided, each of the 12 hard disk drives may be 1.6 inches wide. These dimensions should only be considered as exemplary dimensions in view of the fact that drive sizes and capacity change by disk manufacturer and in view of technological advances in the drive arts. It should also be noted that the storage enclosure 106 can be configured in Pedestal form, Rack form or in a Stackable form.

In another embodiment, the storage enclosure 106 can also include Fibre Channel hubs, which enable the storage enclosures to provide high data transfer rates. As is well known, the data transfer rate of Fibre Channel cabling and interconnects can vary depending upon the desired data transfer rate (e.g., 100 MB per second, 1000 MB per second, etc.).

In the following functional description of FIGS. 1C–29, examples of the graphical user interface (GUI) functional features of the storage administration system are disclosed, with emphasis on those features which facilitate the process of locating, configuring and monitoring storage resources. Of course, the exemplary GUI interfaces can be modified in terms of their appearance and look-and-feel, however, the underlying functional aspects disclosed in the present invention will remain substantially the same.

Figure 1C:
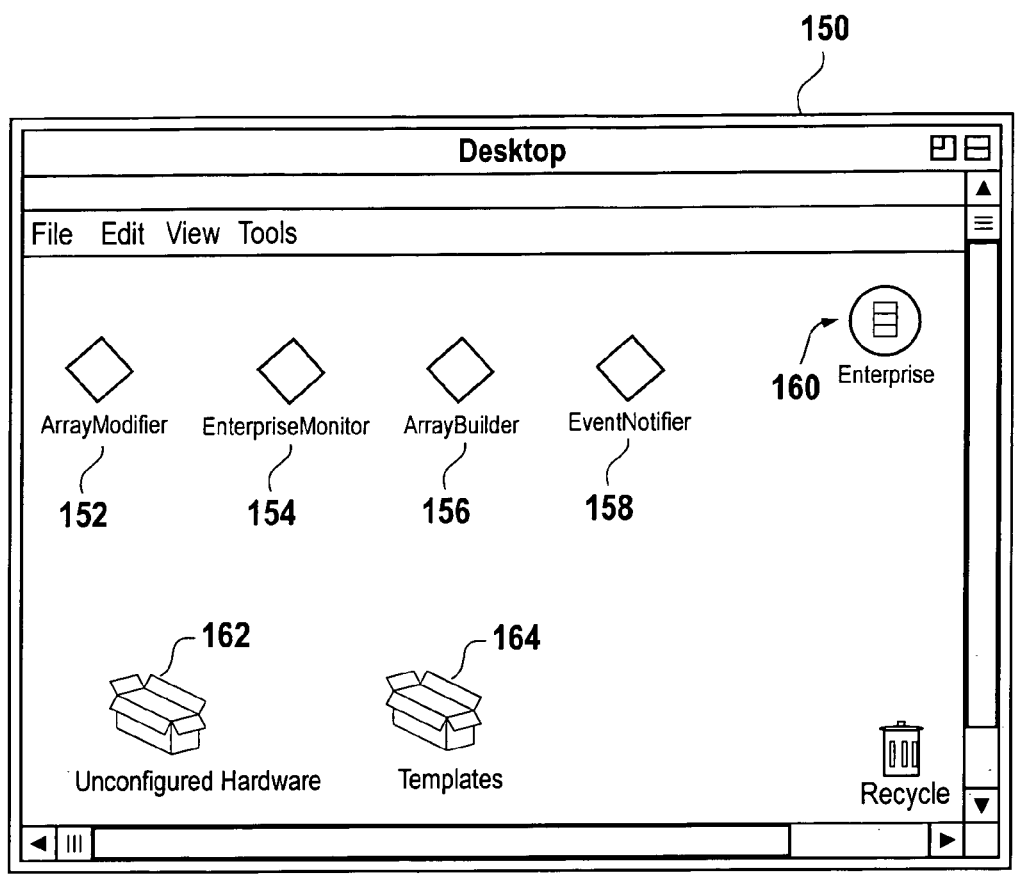
FIG. 1C provides a Desktop window graphical user interface (GUI) that a system administrator will see when administering storage enclosures over the enterprise network from a computer having a client component, in accordance with one embodiment of the present invention.

Reference is now drawn to FIG. 1C, which provides a Desktop window 150 graphical user interface (GUI) that a system administrator (i.e., user) will see when administering storage enclosures over the enterprise network from a computer having the client component. Accordingly, when a user, such as a system administrator, launches a client component of the storage administration system, the first window that opens is the Desktop window 150 of FIG. 1C. The Desktop window 150 provides users immediate access to an overview of the functionality provided by the storage administration system. By way of example, the Desktop window 150 provides a user with quick and visually salient access to the basic functional tools and links. In this embodiment, the functional tools include an Array Modifier 152, an Enterprise Monitor 154, an Array Builder 156, and an Event Notifier 158. Also provided is a view of the network enterprise 102, a list of Unconfigured Hardware 162, and Templates 164 that can be used to quickly configure hardware.

The Desktop window 150 therefore provides a user with powerful functional shortcuts, like dropping an icon of a configuration template 164 on top of an icon of unconfigured hardware (e.g., a storage enclosure 106). It also allows users to drag objects from an Enterprise window 200 (e.g., as shown in FIGS. 12–15) to the Desktop window 150 to create shortcuts to those objects. For example, a user could drag a storage enclosure 106 from the Enterprise window 200 to the Desktop window 105 and a shortcut icon would be created on the Desktop window that points to the original storage enclosure 106. Double-clicking the shortcut icon for the storage enclosure 106 will open the enterprise window 200 with that item highlighted.

Figure 2:
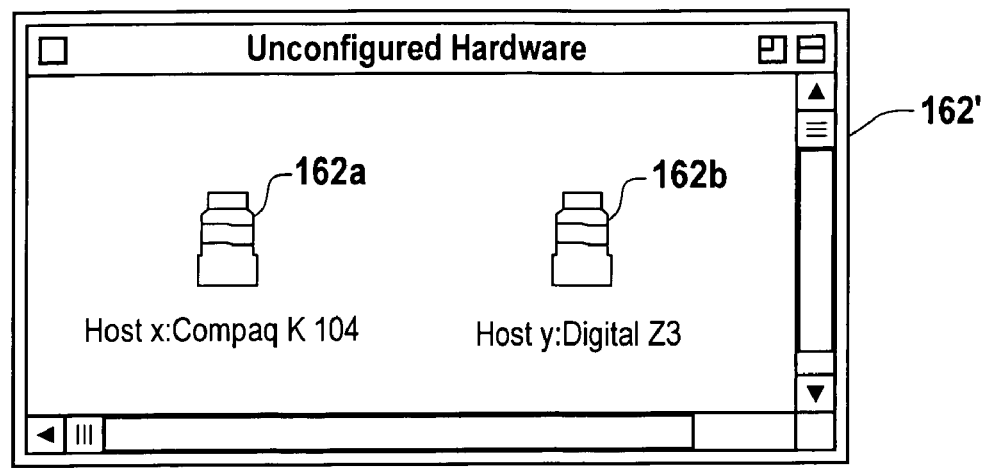
FIG. 2 illustrates an Unconfigured Hardware window that gives a user immediate access to a filtered list of hardware that has not been fully configured.
Figure 10:
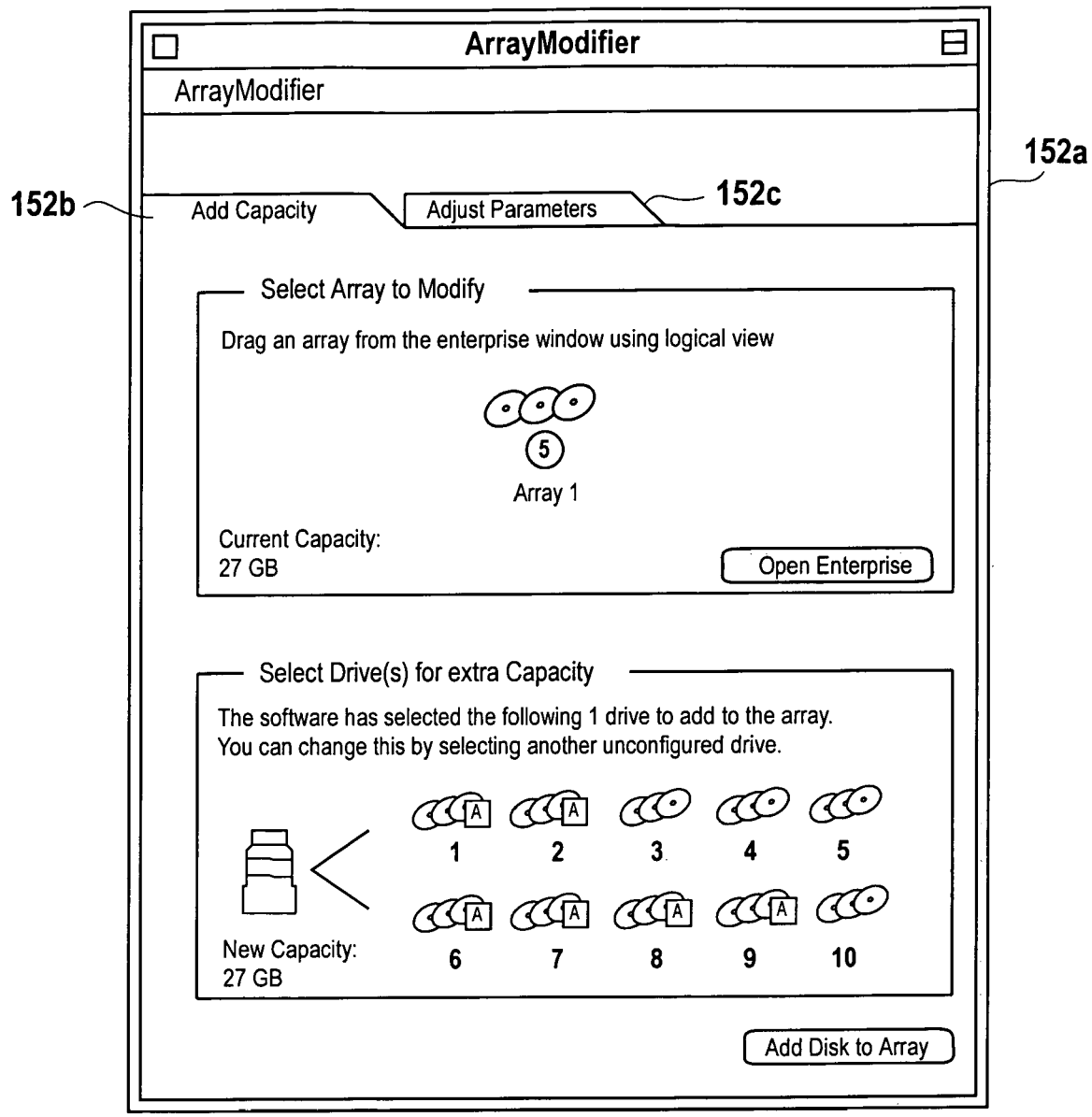
FIG. 10 illustrates an Array Modifier window, in accordance with one embodiment of the present invention.
Figure 12:
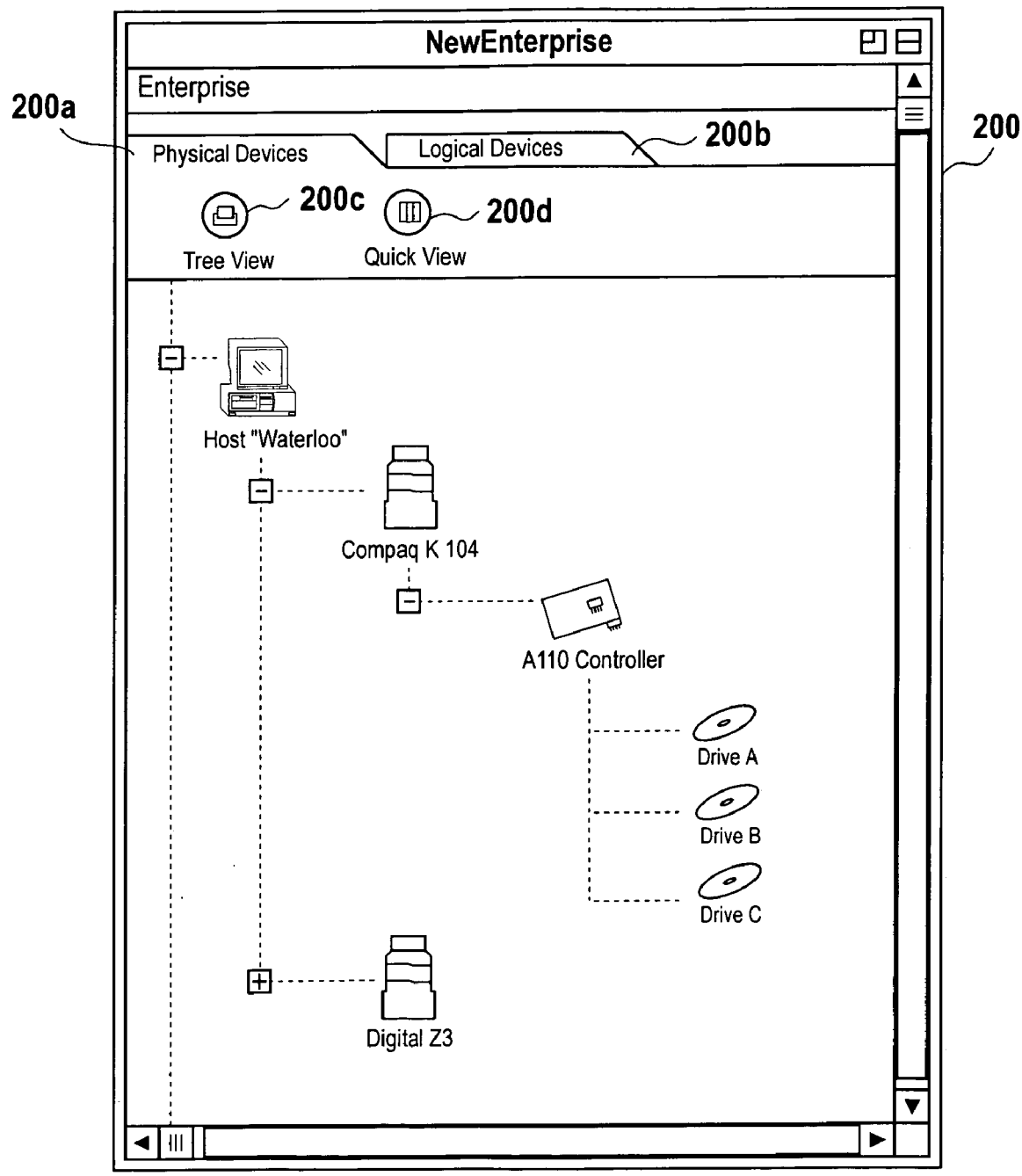
FIGS. 12–15 illustrate Enterprise windows, in accordance with one embodiment of the present invention.
Figure 13:
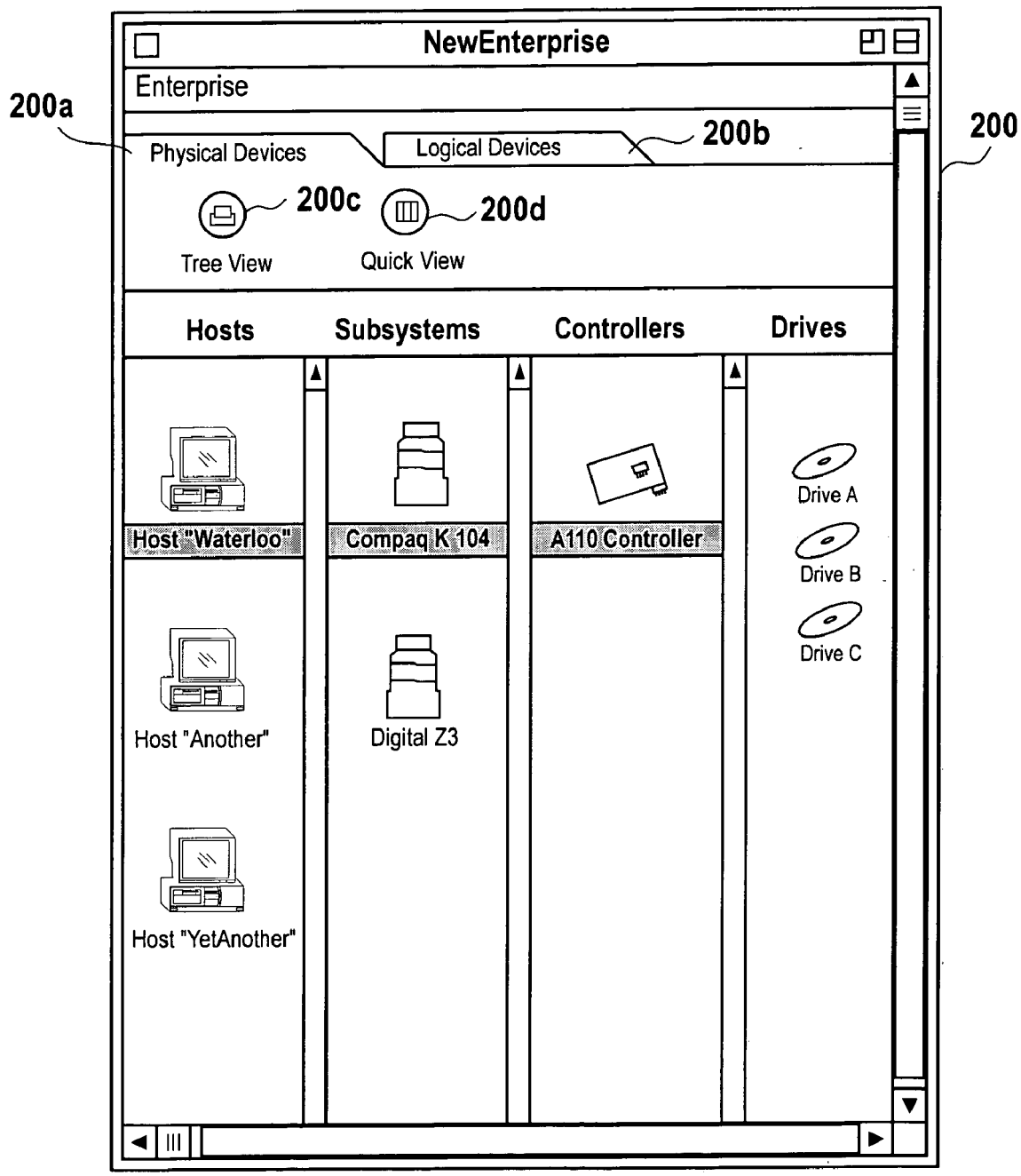
Figure 14:
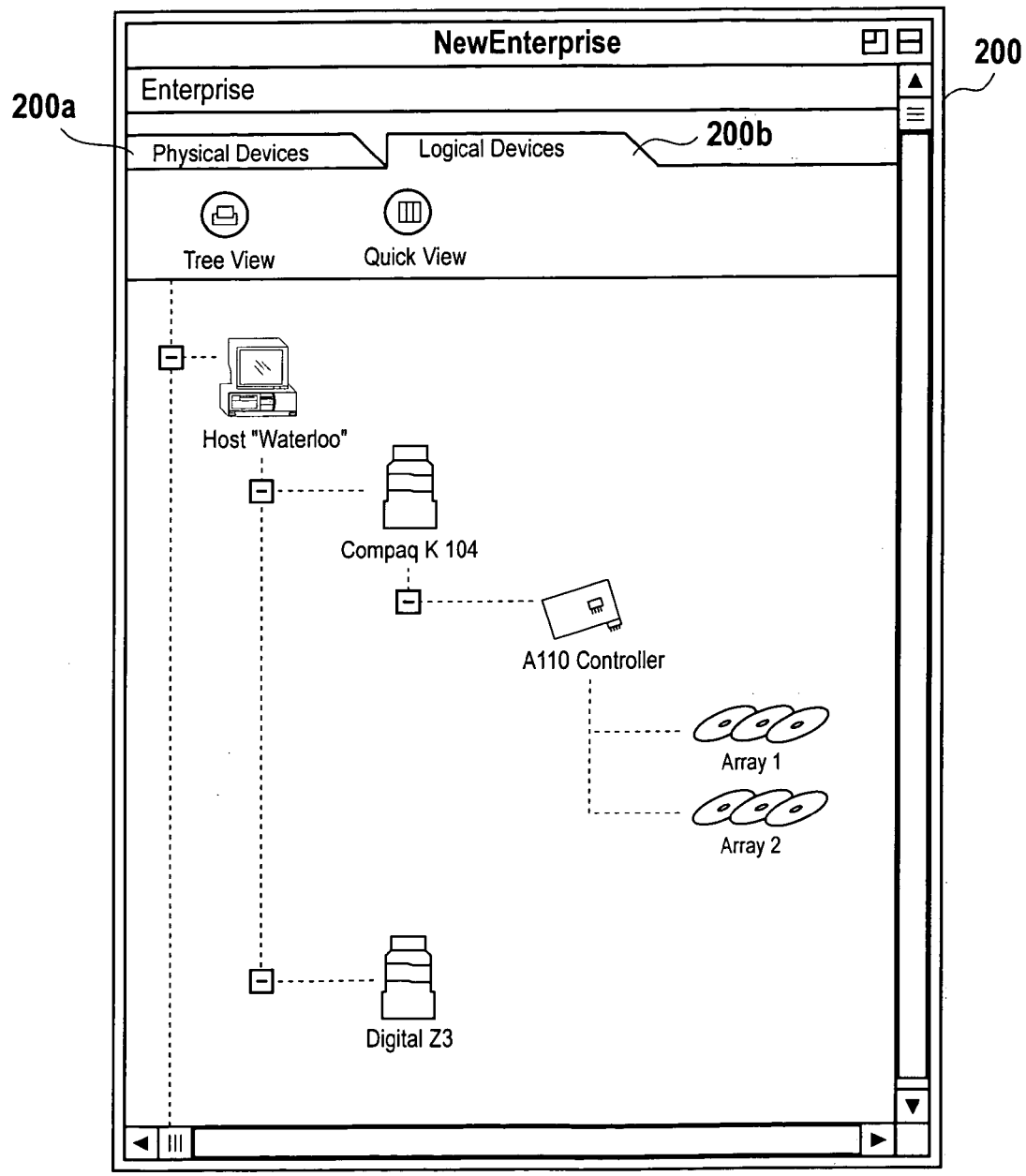

To illustrate the ease of use of the functional embodiments of the present invention, double-clicking the ArrayModifier 152 icon will open the ArrayModifier window 152a of FIG. 10. Double-clicking on the EnterpriseMonitor 154 will open the EnterpriseMonitor window 154' of FIG. 5. Double-clicking on the ArrayBuilder 156 will open the ArrayBuilder window 156a of FIG. 26. Double-clicking the EventNotifier 158 will open the EventNotifier window 158a of FIG. 21. Double-clicking the Enterprise icon 160 will open a window 200 with an overview of all the objects in the enterprise. In FIG. 12, a tree view 200c is illustrated. The window 200 can also be shown in a quick view 200d, which is illustrated in FIG. 13. Double-clicking the 'unconfigured hardware' container 162 of FIG. 1B will open a window that will have representations of all partially or fully unconfigured host systems, which are shown in FIG. 2. As described with reference to FIG. 1A, a host system is preferably a server computer system 104, which may have one or more storage enclosures 106 connected thereto. Double-clicking the templates container 164 will open a window that will show the user representations of all available templates as illustrated in FIG. 3.

Right-clicking on any object (e.g., a host, a drive, a storage container (e.g., a subsystem), an array, or a controller) will show the context menu for that object with the appropriate menu items. For example, the "properties" menu item will open a corresponding window that will display the properties for the object that was right-clicked. These properties are respectively shown in FIGS. 16–20.

Referring again to FIG. 2, the unconfigured hardware window 162' gives a user immediate access to a filtered list that preferably only has hardware that has not been fully configured (i.e., storage enclosures 106 with unassigned hard drives), instead of requiring that the user always navigate through an entire tree to find the hardware of interest. In this example, two storage enclosures 162a and 162b are shown to have unassigned hard drives. From this window, the user can also double-click a hardware representation (i.e., a storage enclosure), and the storage enclosure will open the enterprise window 200 with the selected item highlighted in the tree.

Figure 3:
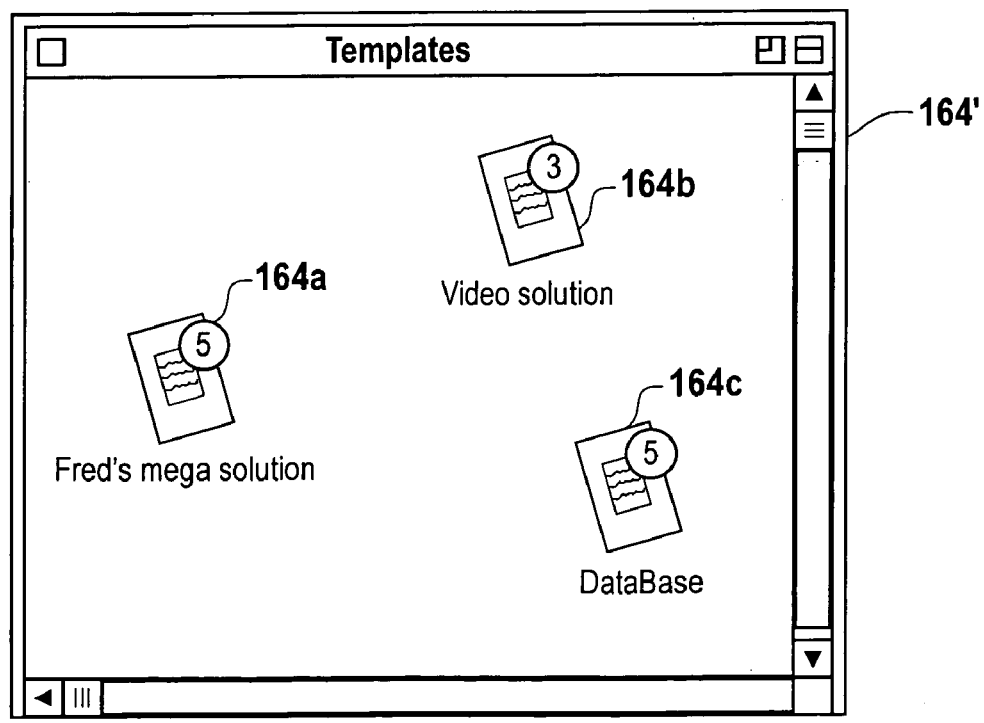
FIG. 3 provides a graphical representation of Templates, which are used to quickly and easily configure hardware, in accordance with one embodiment of the present invention.

FIG. 3 provides a graphical representation of templates, which are used to quickly and easily configure hardware, in accordance with one embodiment of the present invention. More specifically, a user is provided with immediate access to templates that can be used to quickly build a RAID array from the unconfigured hardware. In one embodiment of the present invention, a template is used to specify all parameters and settings that are required to build a RAID array, with the exception of selecting the actual disks to use in the array. A more detailed view of a RAID template is provided in FIG. 4, which shows general information 170a about the template and associated features 170b.

Figure 28:
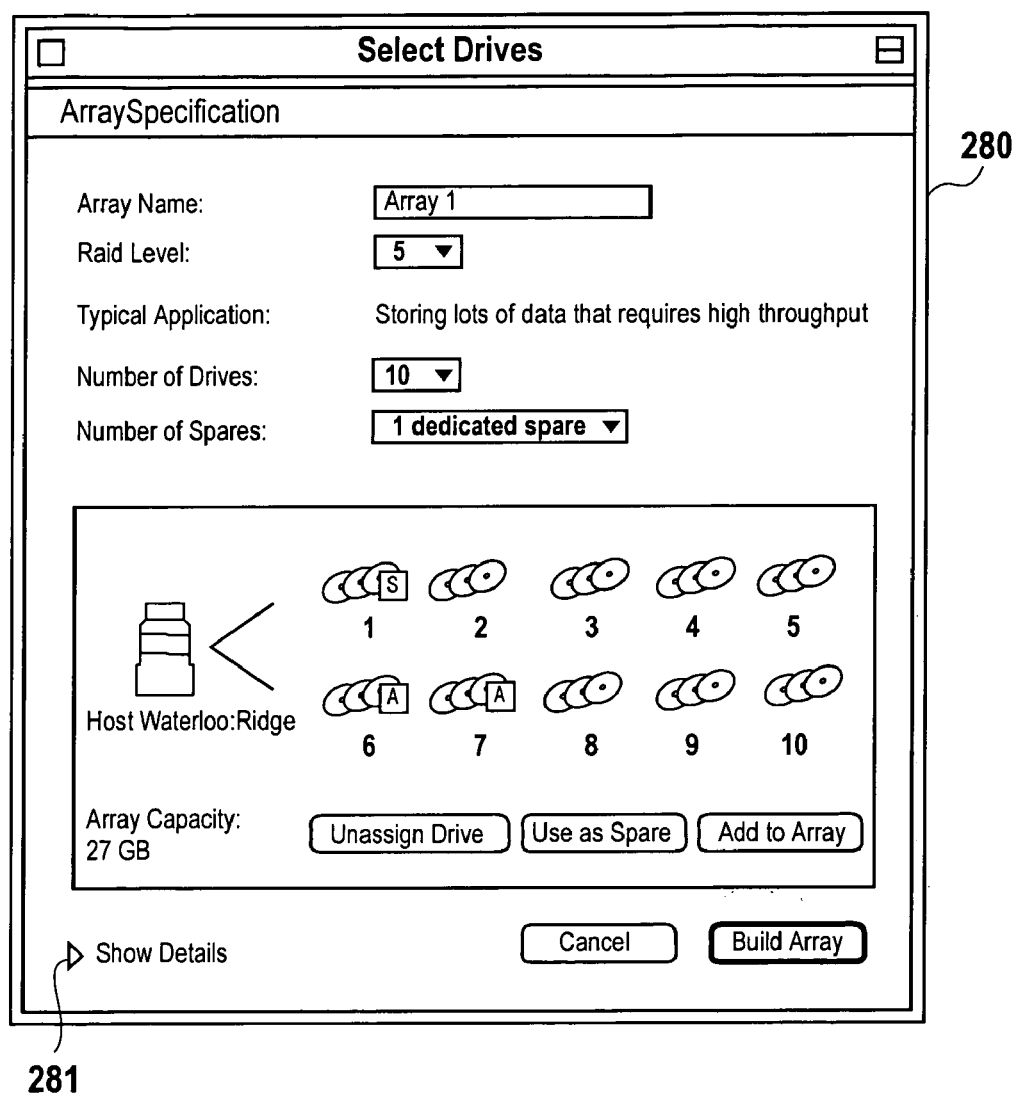
FIGS. 28 and 29 illustrate Select Drives windows, in accordance with one embodiment of the present invention.

Of course, the user can choose to specify all of these parameters and settings "manually," but templates provide a faster and simpler way for users to build an array without being presented with all of these settings. The user can drag and drop a template on the icon of an unconfigured storage enclosure 106, drag and drop a storage enclosure icon on the template, apply the template to a storage enclosure from the context menu, or choose a template from the list of templates in the Array Builder window 156a of FIG. 26. The user is then presented with a confirmation dialog that allows the user to select the drives to be used in the array, and then click Build Array 280 to finish as shown in FIG. 28. Additionally, if the user double-clicks on the template representation (e.g., 164a–164c), the administration system will open the template window 170 of FIG. 4.

Figure 4:
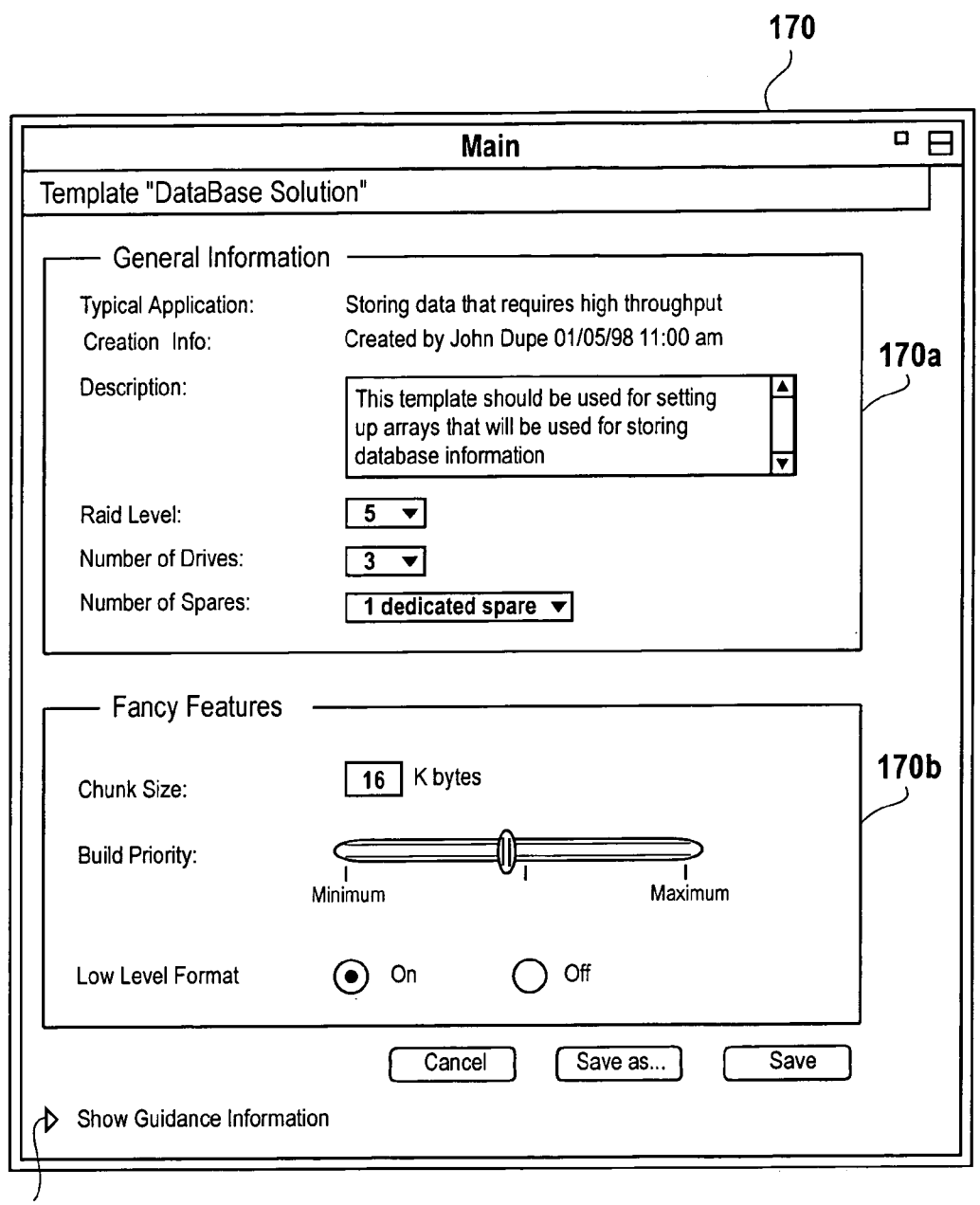
FIG. 4 illustrates a Template window, in accordance with one embodiment of the present invention.

In the template window 170 of FIG. 4, a user is able to see the settings specified by a specific template for building an array. Note that users will have access to guidance information in each dialog by clicking Show Guidance Information 171. This will provide more information and explanations of the settings and terms used in that dialog.

Figure 5:
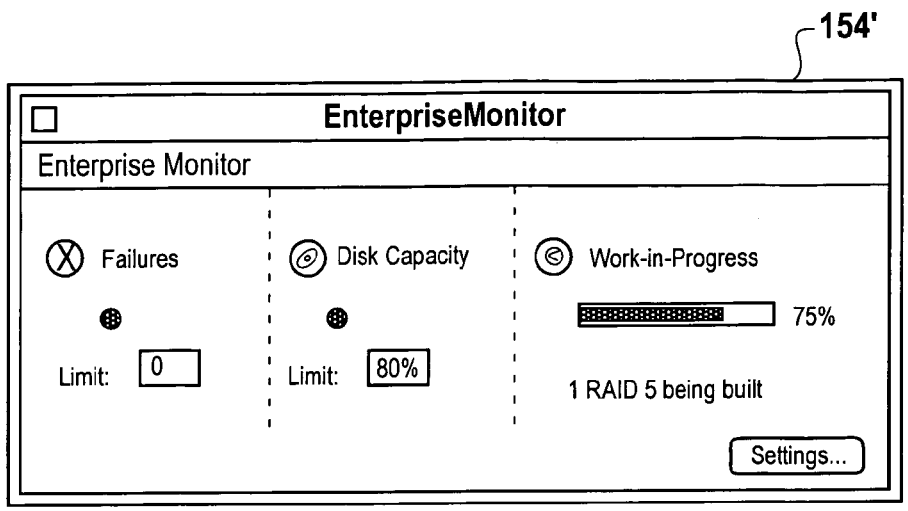
FIG. 5 illustrates an Enterprise Monitor window, in accordance with one embodiment of the present invention.

FIG. 5 illustrates an EnterpriseMonitor window 154', which gives users an immediate overview of the health of their entire enterprise network 102 (i.e., in a summary format). This window is designed so that it will take up minimum real estate on a user's screen. By way of example, a system administrator is able work on his computer (having the client component) other non-administration tasks while the window 154' is moved to a free space of the screen. At the same time, however, the system administrator can be manually viewing the status of the enterprise (or arrays that the administrator is assigned to service). If a failure is reported via this window, the administrator can stop working on his current job and move to resolve the failure. Accordingly, the user can dismiss or minimize all other windows of the application and leave this monitor running in a corner of the screen.

Figure 6:
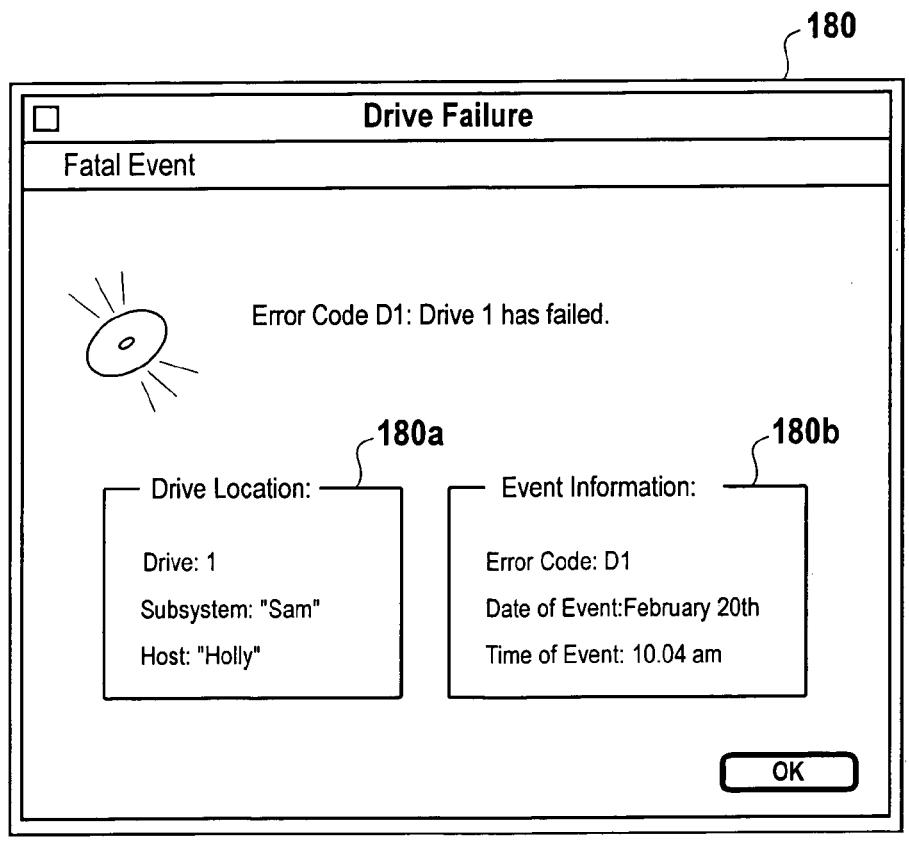
FIG. 6 illustrates a Drive Failure window, in accordance with one embodiment of the present invention.
Figure 7:
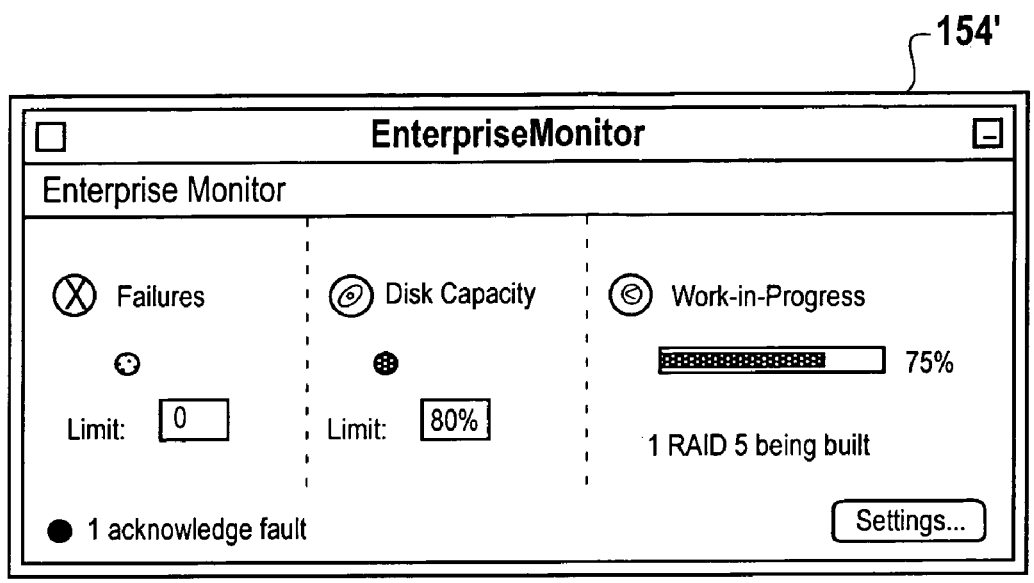
FIG. 7 illustrates an Enterprise Monitor window, in accordance with one embodiment of the present invention.

In still another embodiment, if a failure occurs in the enterprise, a window 180 of FIG. 6 will pop up informing the user/system administrator about the error. If the user clicks on the settings button, the window of FIG. 8 will be displayed. Via the exemplary GUI of FIG. 6, the user will be provided with immediate notification of when a failure occurs. To further assist the user, information necessary to address the failure (e.g., what happened, where, and when) is provided in 180a and 180b. The user can click OK to dismiss the alert and then the Enterprise Monitor will display an LED and string indicating the number of failures that have been acknowledged, but haven't been addressed yet. For instance, FIG. 7 illustrates an Enterprise Monitor 154', which provides a user with feedback that an acknowledged failure still exists.

Figure 8:
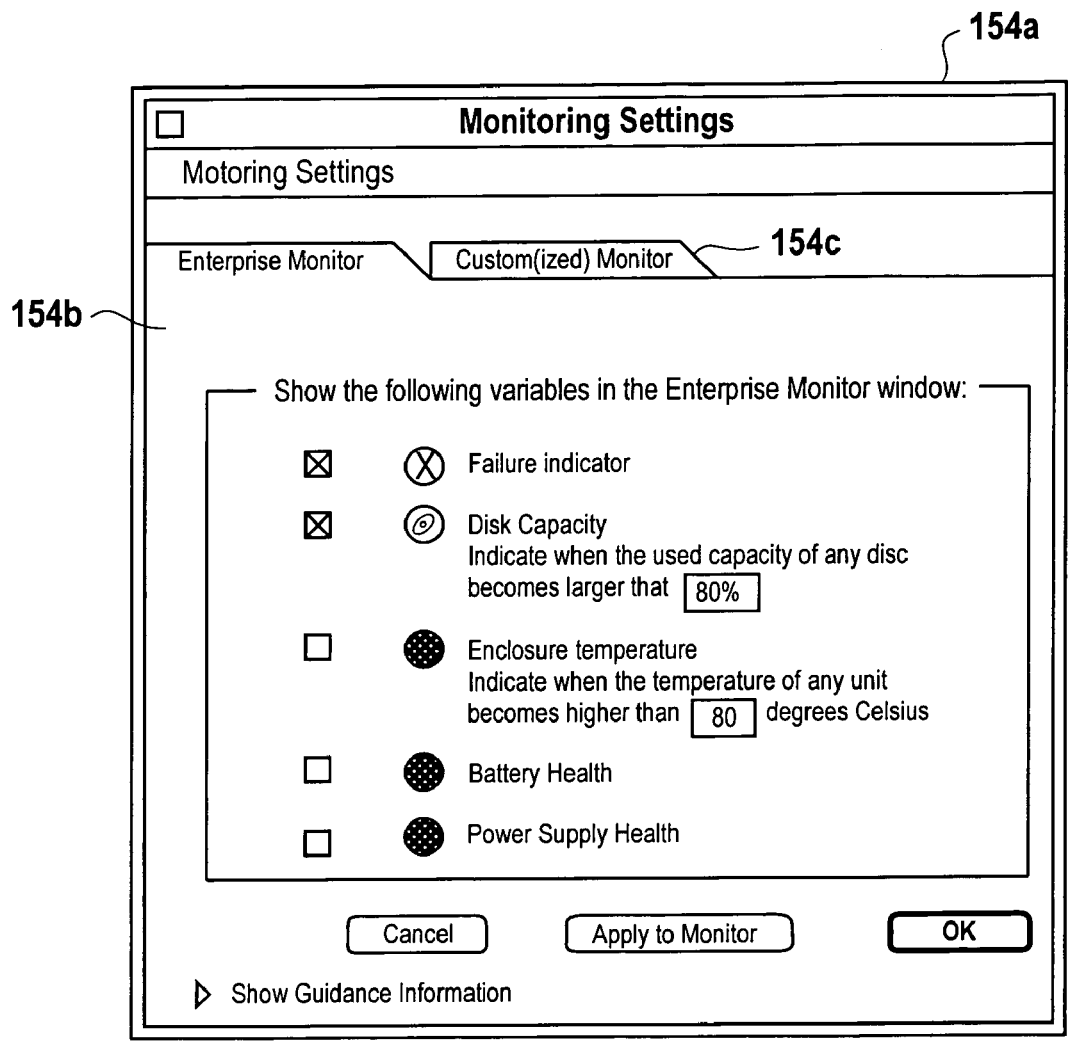
FIG. 8 illustrates a Monitoring Settings window, in accordance with one embodiment of the present invention.

With reference to FIG. 8, a Monitoring Settings for Enterprise Monitor window 154a is provided. Through this window, a user is allowed to specify which variables to display and monitor in the Enterprise Monitor and any settings for those variables. As shown, an Enterprise Monitor tab 154a and a custom monitor tab 154c are provided to enable the user to gain access to additional monitoring information. In the Enterprise Monitor tab 154a, for example, a failure indicator, a disk capacity indicator, an enclosure temperature indicator, a battery heath indicator, and a power supply heath indicator are shown. By customizing these monitors, the Enterprise Monitor 154' can be tailored to the needs of the responsibilities of each system administrator.

Figure 9:
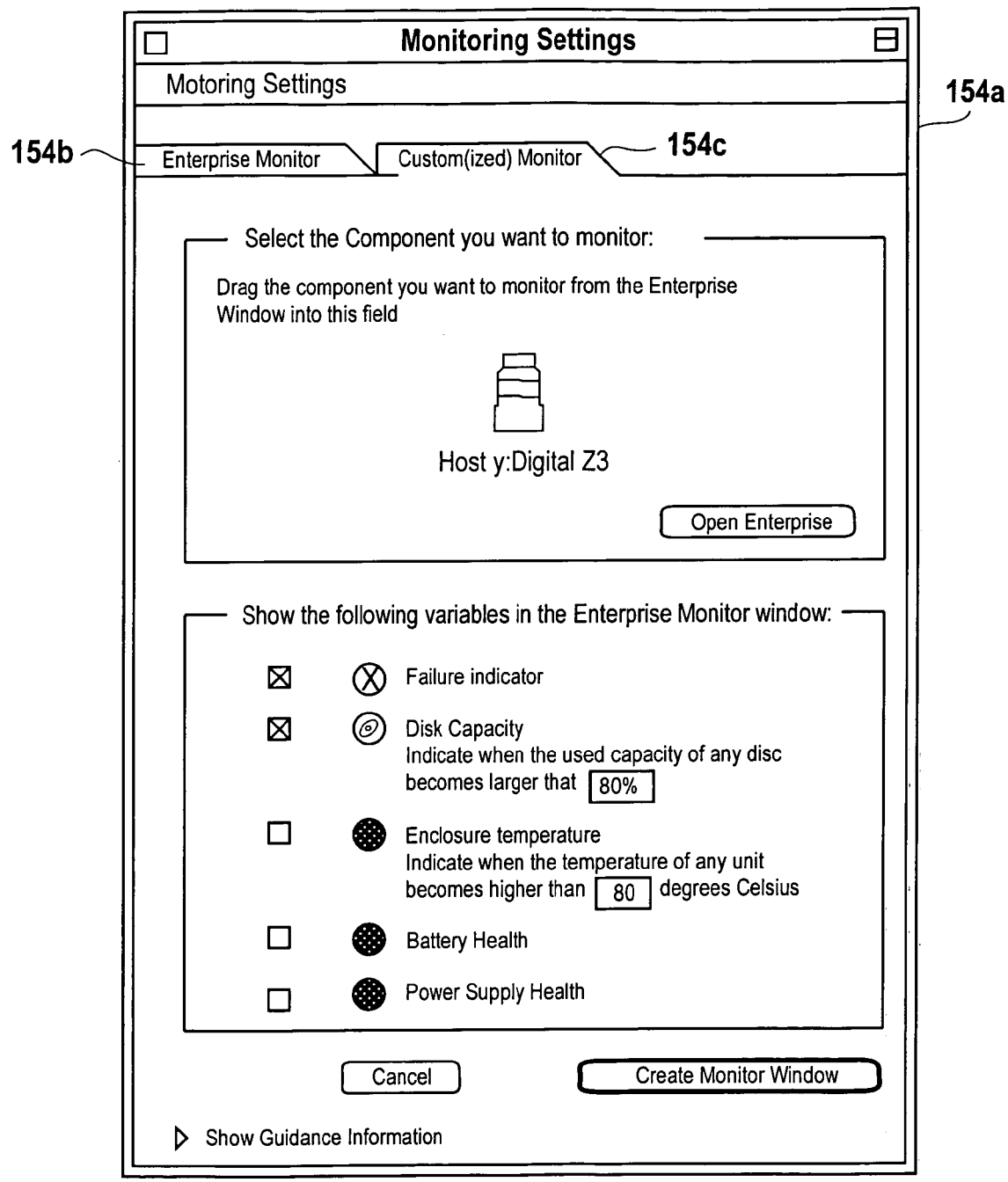
FIG. 9 illustrates another Monitoring Setting window, in accordance with one embodiment of the present invention.

In FIG. 9, the customize window 154c is shown having a plurality of exemplary settings for building custom monitor window. For example, this control allow users to create a custom monitor window for any object in the enterprise network 102 (e.g., a storage enclosure). This also allows users to specify which variables to display and monitor in the custom monitor window and any settings for those variables.

FIG. 10 shows an ArrayModifier window 152a, which allows users to add capacity to an array online and to tweak drive cache parameters of an array. By clicking the "Add Disk to Array" button, the software will display a progress window.

Figure 11:
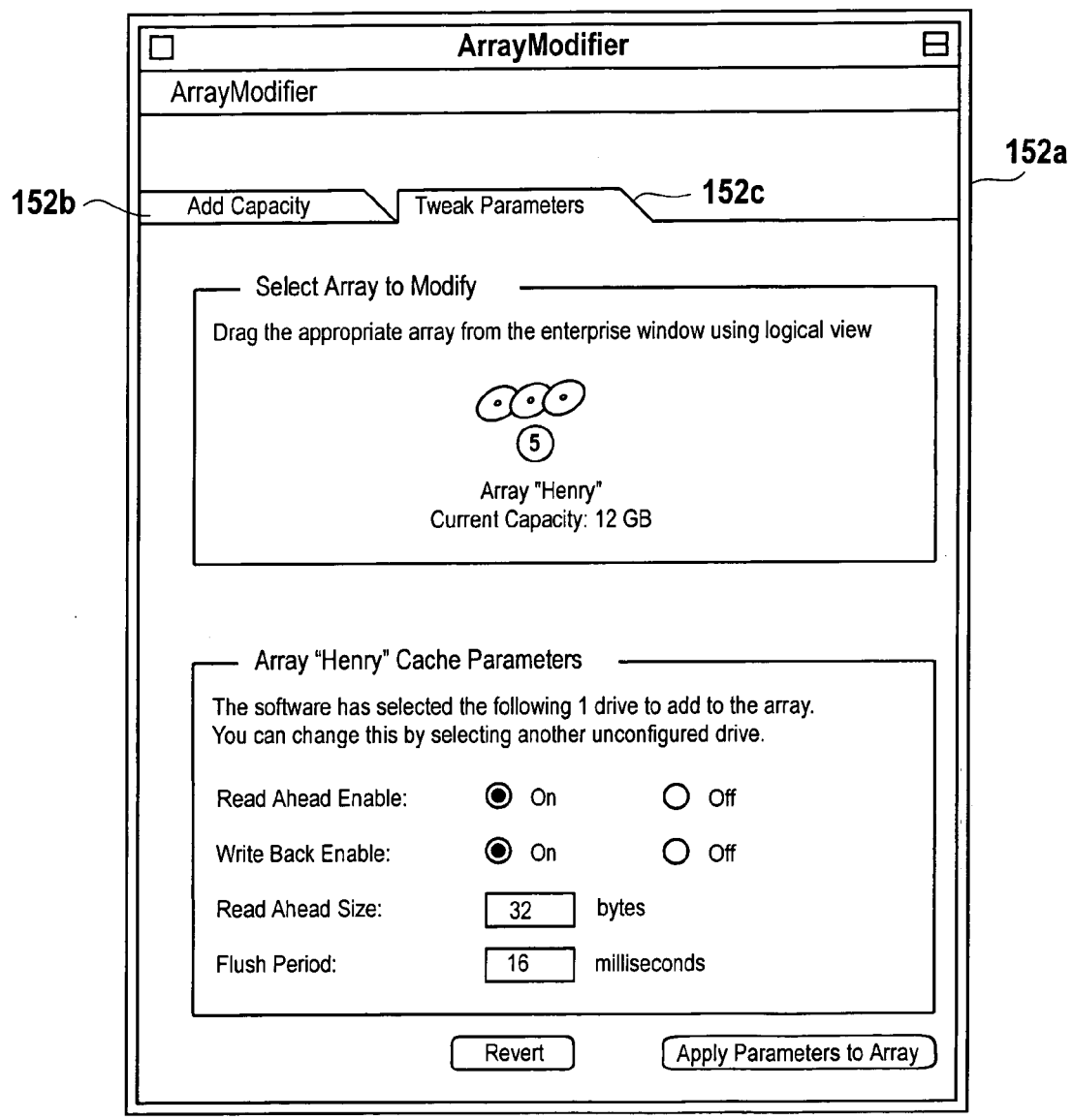
FIG. 11 illustrates another Array Modifier window, in accordance with one embodiment of the present invention.

FIG. 11 shows another view of the ArrayModifier window 152a, having the tweak parameters tab 152c selected. By clicking the "Revert" button, the software will set the parameters in this window back to the state when the window was opened last. Further, by clicking "Apply Parameters to Array" will dismiss this window and bring up a progress window.

Figure 16:
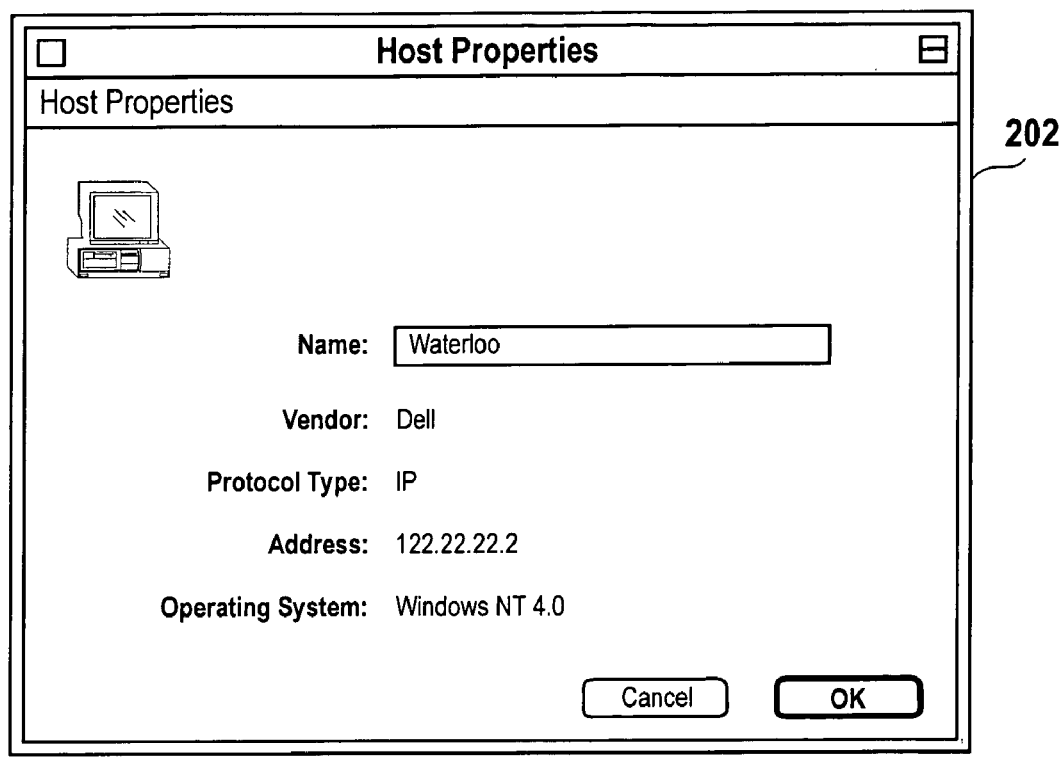
FIGS. 16–20 illustrate Properties windows, in accordance with one embodiment of the present invention.

FIG. 12 shows an exemplary Enterprise window 200, having tabs 200a and 200b for selecting either physical devices or logical devices. Via this window 200, the user is given an overview of the physical objects in the enterprise (e.g., hosts, storage enclosures, controllers, hard drives), their containment, etc. At this point, the user can access the functionality, like Build Array, using a right click menu. If the user double-clicks an object, a window that shows the object's properties, e.g., as shown in FIG. 16, will be displayed. If the user right-clicks an object, a context sensitive menu for the object will also be displayed. If the user clicks on the logical devices tab 200b, the system will open the window of FIG. 14. If the user clicks on the quick view button 200d, the window of FIG. 13 will be displayed.

FIG. 13 therefore represents a quick view of the enterprise 200. Broadly speaking, this view provides a better overview of all the objects in the network enterprise 102 and allows the user to navigate faster through a large hierarchy of items. For instance, the user can see more hosts (i.e., server computers 104) at one time in the list and quickly navigate the hierarchy to see the storage enclosures 106, controllers, and drives. The user may select a host from the list of hosts and then will see a list of all of the storage enclosures attached to that host. The user can then select a storage enclosure (i.e., subsystem) from the list and then see a list of the controllers in that storage enclosure (e.g., a single controller, or two controllers in a dual controller hardware configuration). The user is then able to select a controller and see a list of the drives that it controls.

Double-clicking an item in any of the columns will cause the contents of the item to be displayed. Right-clicking on an object will cause a context sensitive menu for the object to be displayed. Through FIG. 14, a user is allowed to see logical devices in the enterprise (e.g., Arrays).

Figure 15:
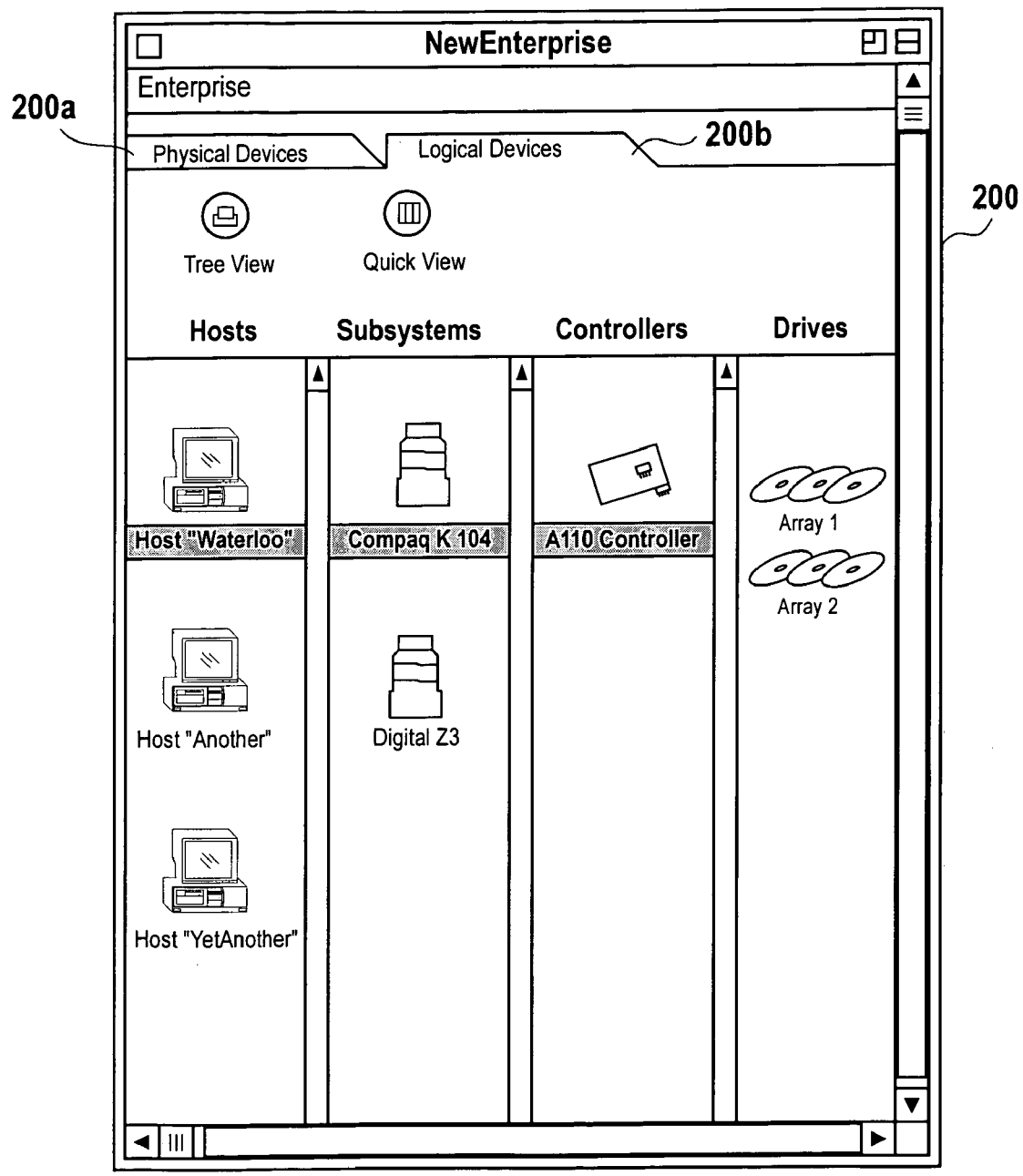

FIG. 15 provides a quick view of the logical devices of the enterprise, in accordance with one embodiment of the present invention. For example, this view allows a user to see the logical devices in the enterprise. It provides a better overview of all the objects in the enterprise and allows the user to navigate faster through a large hierarchy of items. Further, the user can see more hosts at one time in the list and quickly navigate the hierarchy to see the subsystems (i.e., storage enclosures 106), controllers, and arrays. The user can select a host from the list of hosts and will then see a list of all of the subsystems attached to that host. The user then selects a subsystem from the list of subsystems and will see a list of the controllers in that subsystem (e.g., a single controller, or two controllers in a dual controller hardware configuration). The user then selects a controller and will see a list of the arrays that it controls.

Figure 17:
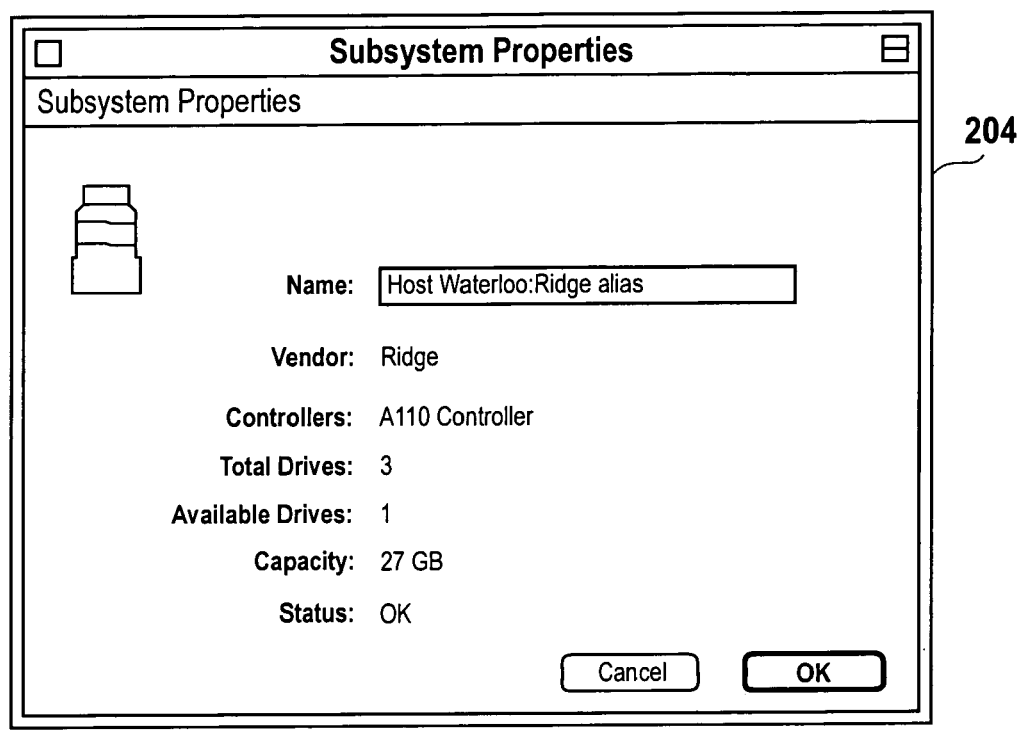
Figure 18:
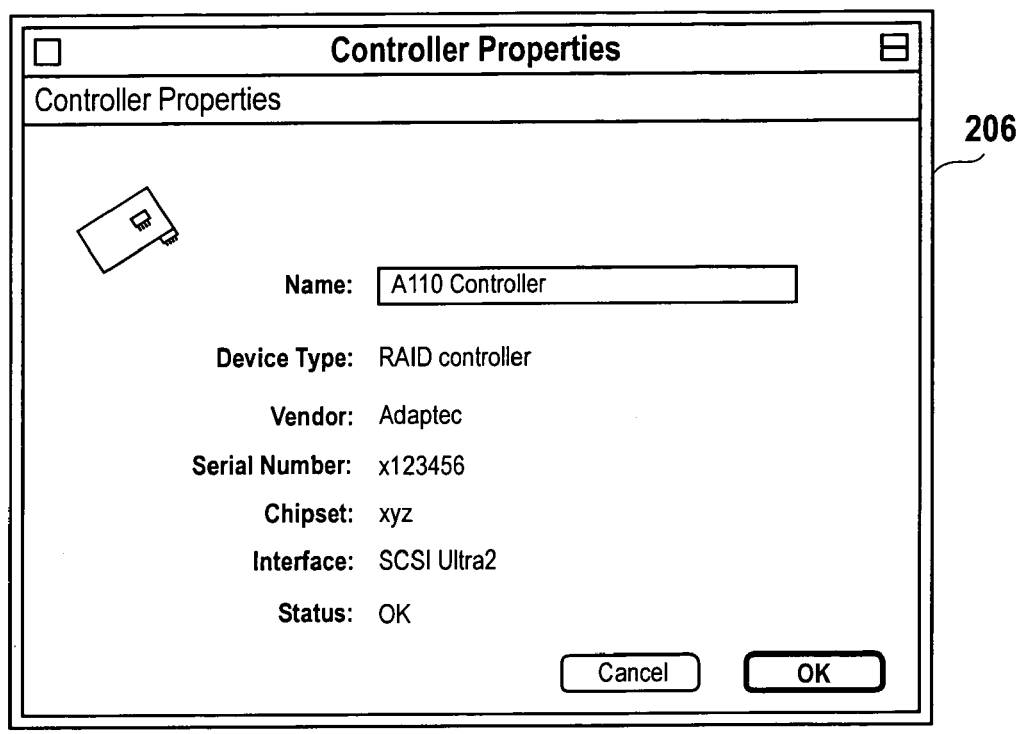
Figure 19:
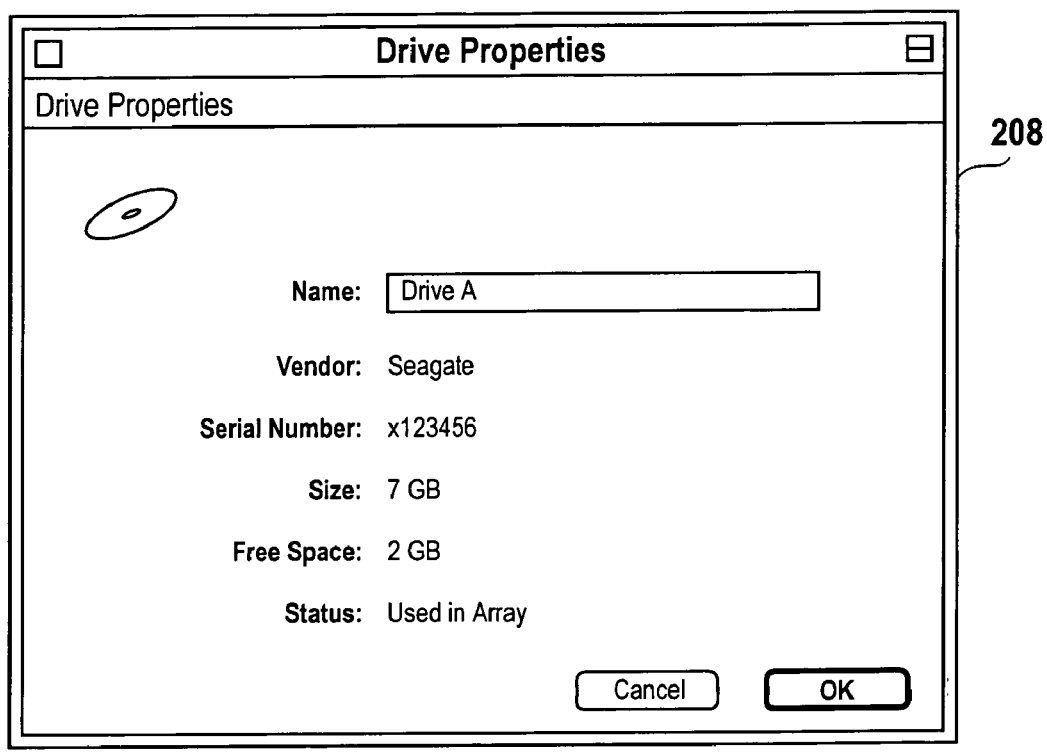
Figure 20:
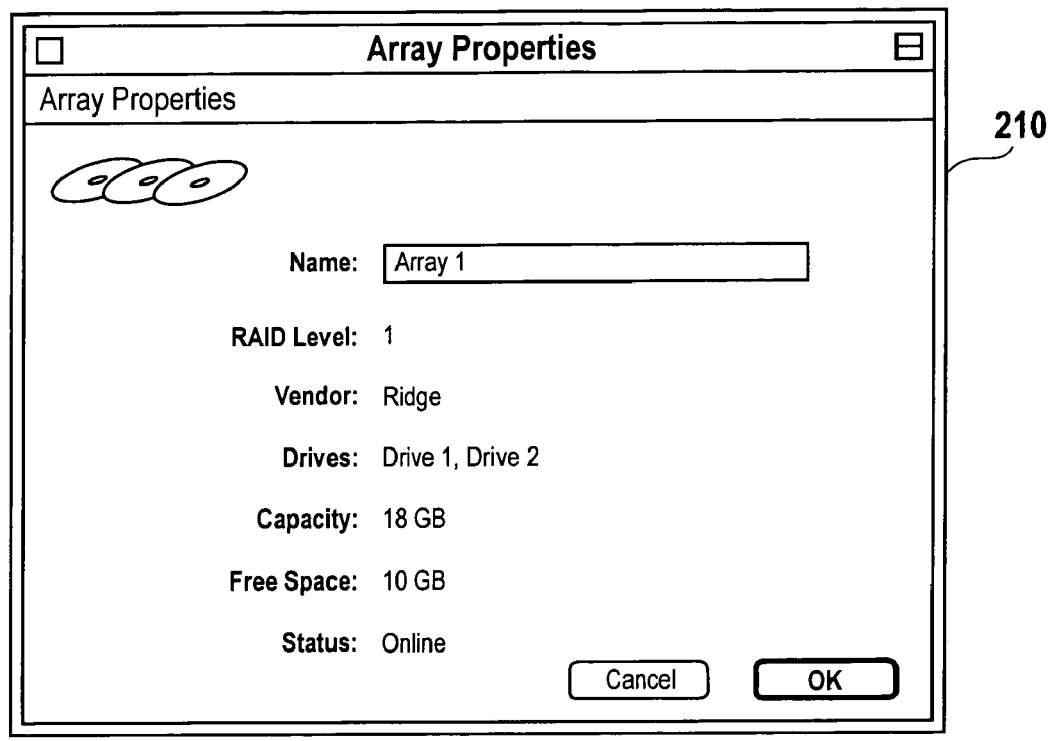

FIG. 16 provides a host properties window 202. In this example, the host is Waterloo. This host has its properties, such as, vendor, protocol type, address, and operating system clearly displayed for the user to see. FIG. 17 is a subsystem properties window 204, which identifies an exemplary storage enclosure and the host it is connected to. FIG. 18 shows a controller properties window 206. In this example, the controller card is an Adaptec, Inc. RAID controller Card that is connected via a SCSI interface. FIG. 19 shows a drive properties window 208. All of the important drive properties are provided so that the user/administrator can quickly identify the drive characteristics. If the drive were to fail, the administrator who may have been monitoring the enterprise from a remote location, can quickly ascertain a drive type in case of failure. By having this power, the enterprise administrator can quickly obtain an identical replacement drive and install the drive without having to go and inspect the drive at the physical location, which may be remotely located (e.g., at another building). Finally, FIG. 20 shows an array properties window 210, which shows the RAID level, the vendor, the drives, the capacity, the free space, and the status.

Figure 21:
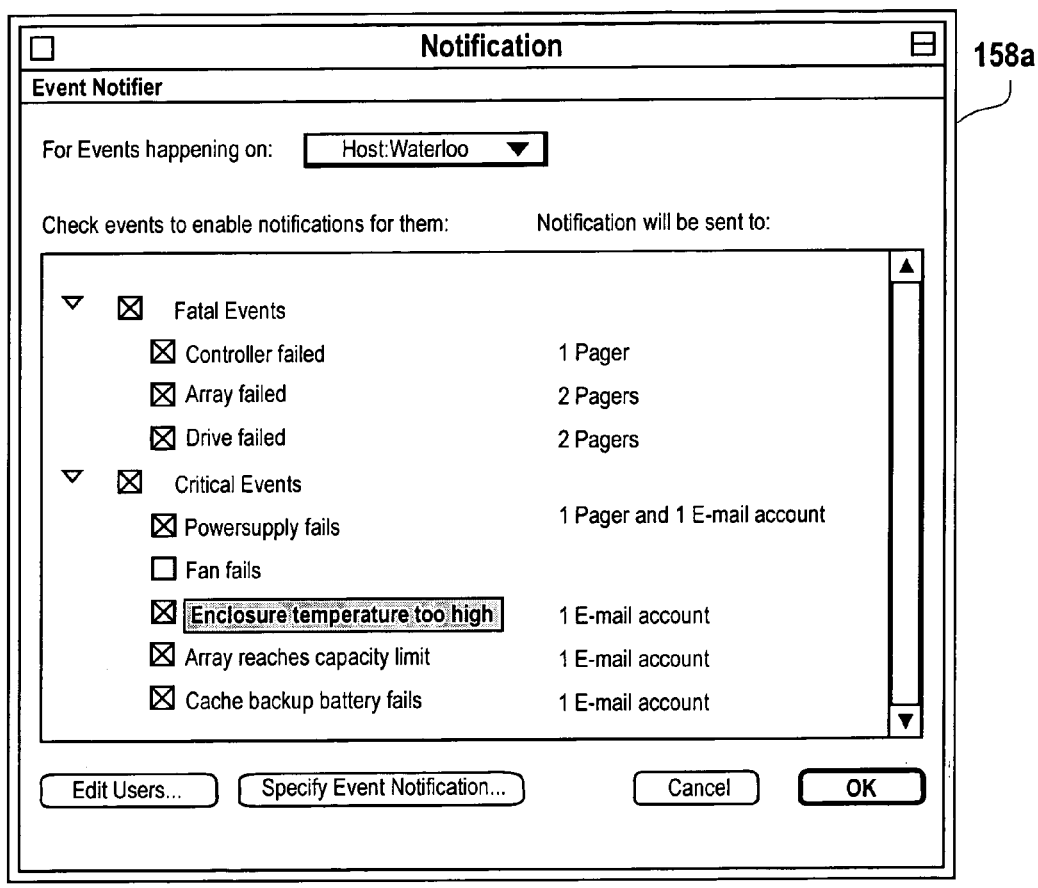
FIG. 21 illustrates a Notification window, in accordance with one embodiment of the present invention.

FIG. 21 shows an even notification window 158a, in accordance with one embodiment of the present invention. In this embodiment, the user is allowed to see and specify the event notification settings for a specific host object. If the user clicks the host pop-up menu at the top of the window, the user can select any host (e.g., a computer having the server component) in the enterprise in order to see and specify its notification settings. The user can select the events for which the user wants notifications sent for a particular host. Events can be collapsed into two groups (Fatal Events and Critical Events) and then notification can be quickly specified for those events as a whole. Otherwise, the groups can be disclosed and display all of the events in the group, which enables the user to specify notification separately for each individual event.

Figure 22:
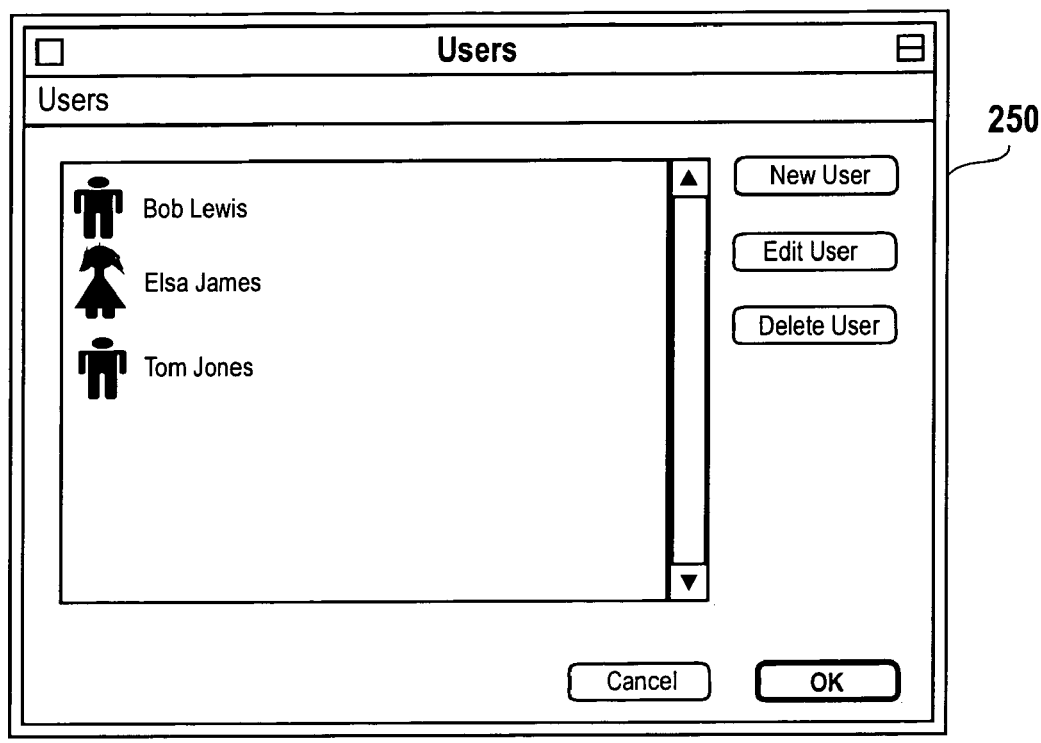
FIG. 22 illustrates a Users window, in accordance with one embodiment of the present invention.

If the user clicks the "Edit Users" button a window is opened that lists the users as shown in FIG. 22. If the user double-clicks an event or clicks Specify Event Notification, a window is opened that allows the user to specify the notification settings for that event, such as who gets notified and how, as illustrated in FIG. 25.

Figure 23:
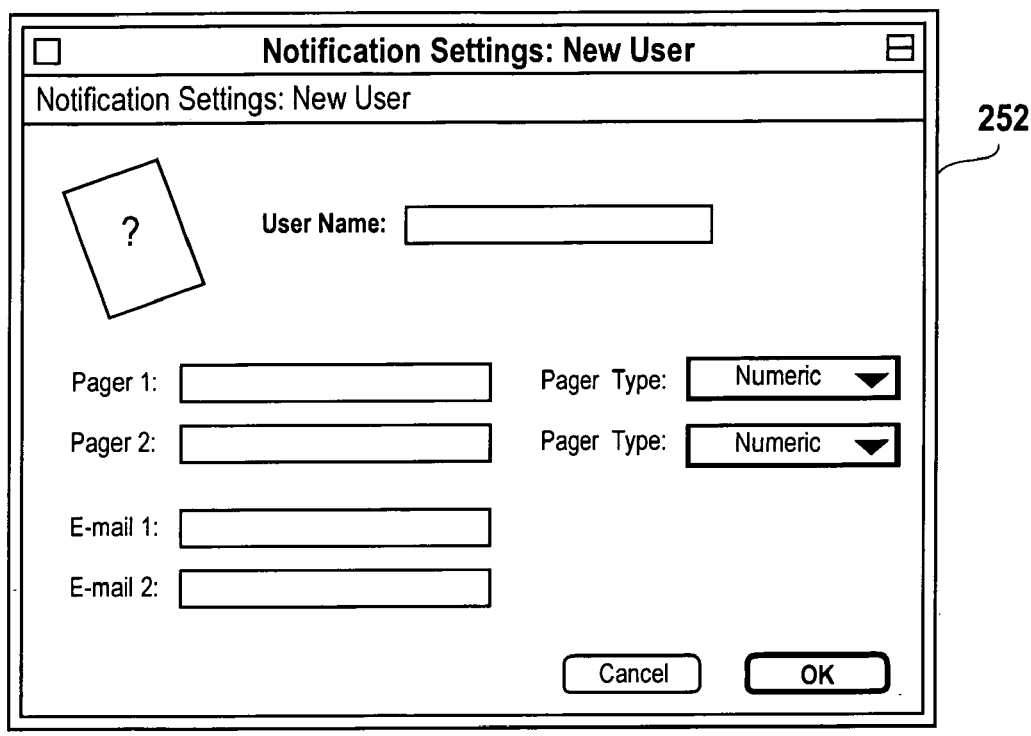
FIGS. 23–25 illustrate Notification Settings windows, in accordance with one embodiment of the present invention.
Figure 24:
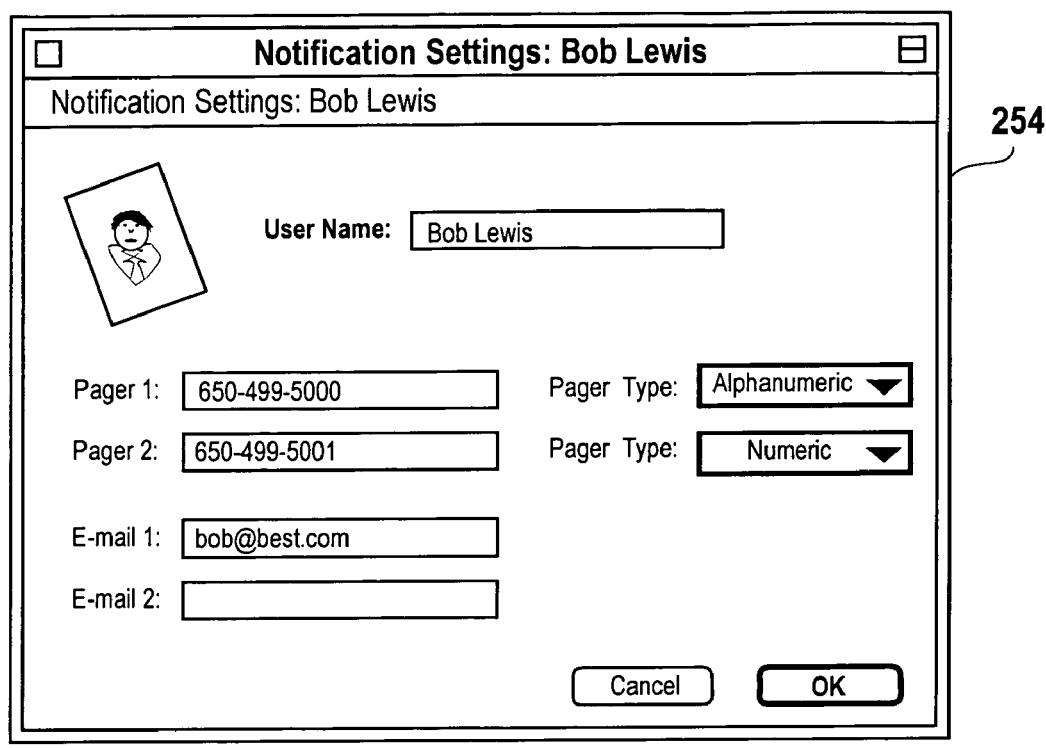

FIG. 22 shows the users window 250, which allows viewing and modification of the users list. Thus, existing accounts can be viewed and edited in a simplistic manner through window 250. If the user clicks the New User button, a window is opened that allows the user to specify a new user account and its notification settings as shown in FIG. 23. If the user double-clicks a user or clicks the Edit User button, a window is opened that allows the user to edit the selected user's account information as shown in FIG. 24. If the user clicks the Delete User button, the selected user is removed from the list. In a preferred embodiment, the user is only deleted after confirming the deletion. The OK button accepts changes and closes the window. The Cancel button closes the window without saving changes.

FIG. 23 shows a notification settings window 252 for a new user. As shown, a user is allowed to create a new user account and the notification methods established (e.g., pager number, email addresses, etc.). FIG. 24 illustrates a notification settings window 254 with the settings for a user, Bob Lewis. Through this window, a user is allowed to see and edit the notification methods for a user account.

Figure 25:
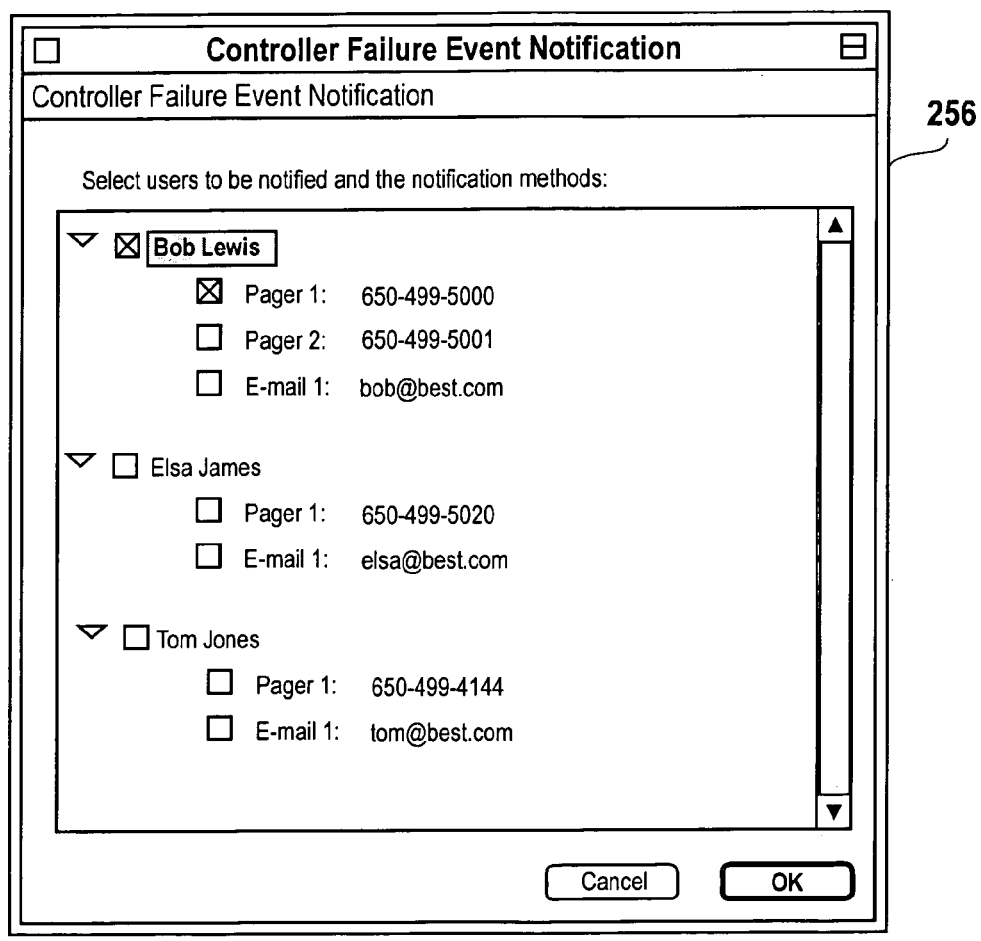

FIG. 25 illustrates an Event notification window 256 for a controller failure, in accordance with one embodiment of the present invention. In one embodiment, this window allows a user to see and specify the event notification settings for a specific event (e.g., controller card failures). The entire list of users is displayed and the user can select which users to notify for the event (e.g., Bob Lewis) and how they should be notified (e.g., by Pager 1).

Figure 26:
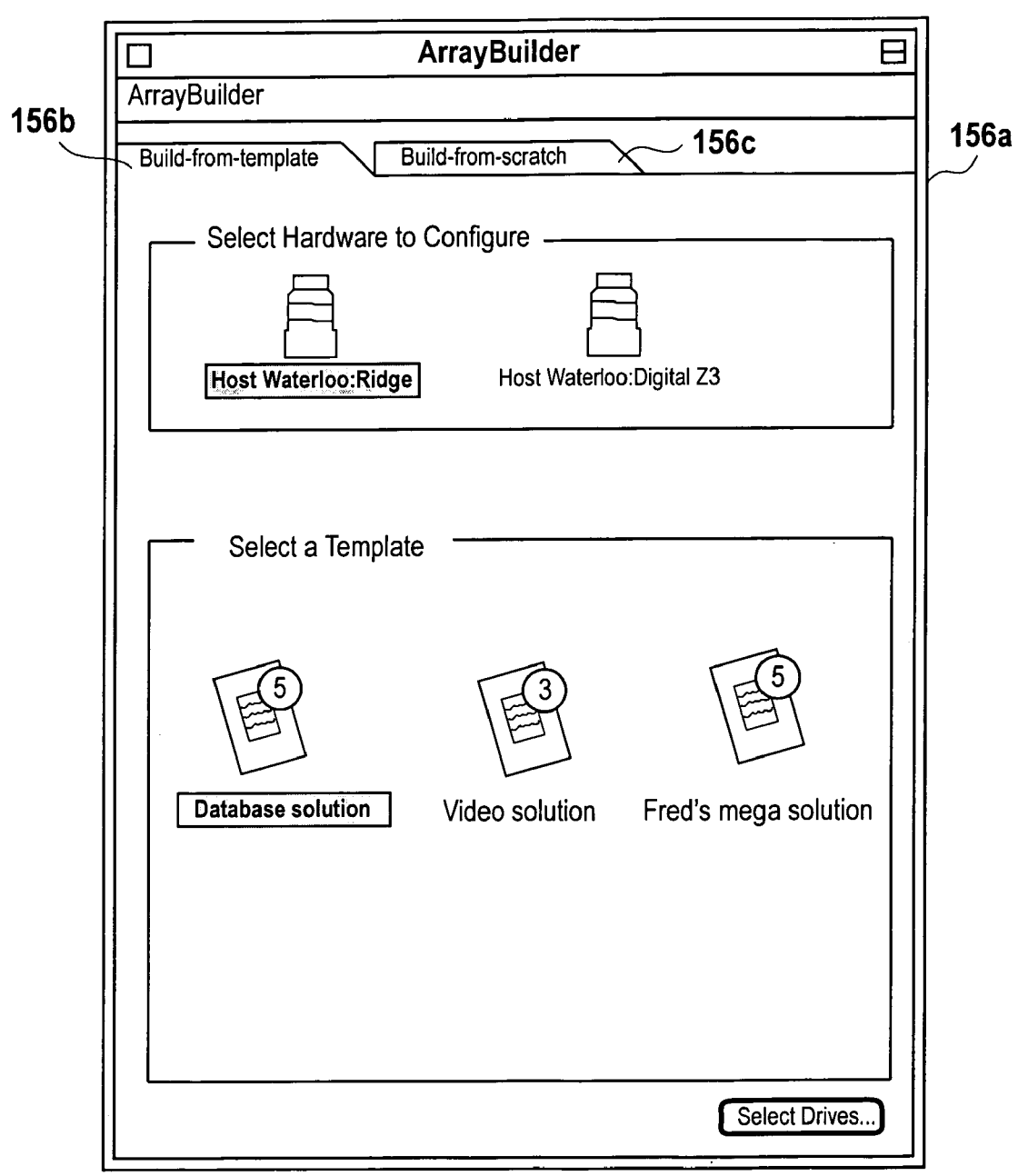
FIGS. 26 and 27 illustrate Array Builder windows, in accordance with one embodiment of the present invention.

FIG. 26 shows an ArrayBuilder window 156a. Through this window, a user is allowed to build an array for the selected subsystem by using a template. The top container in the window provides the user with a list of unconfigured subsystems. The bottom container lists available templates. By clicking Select Drives, the user is allowed to specify the drives to be used for the array as shown in FIGS. 28 and 29.

Figure 27:
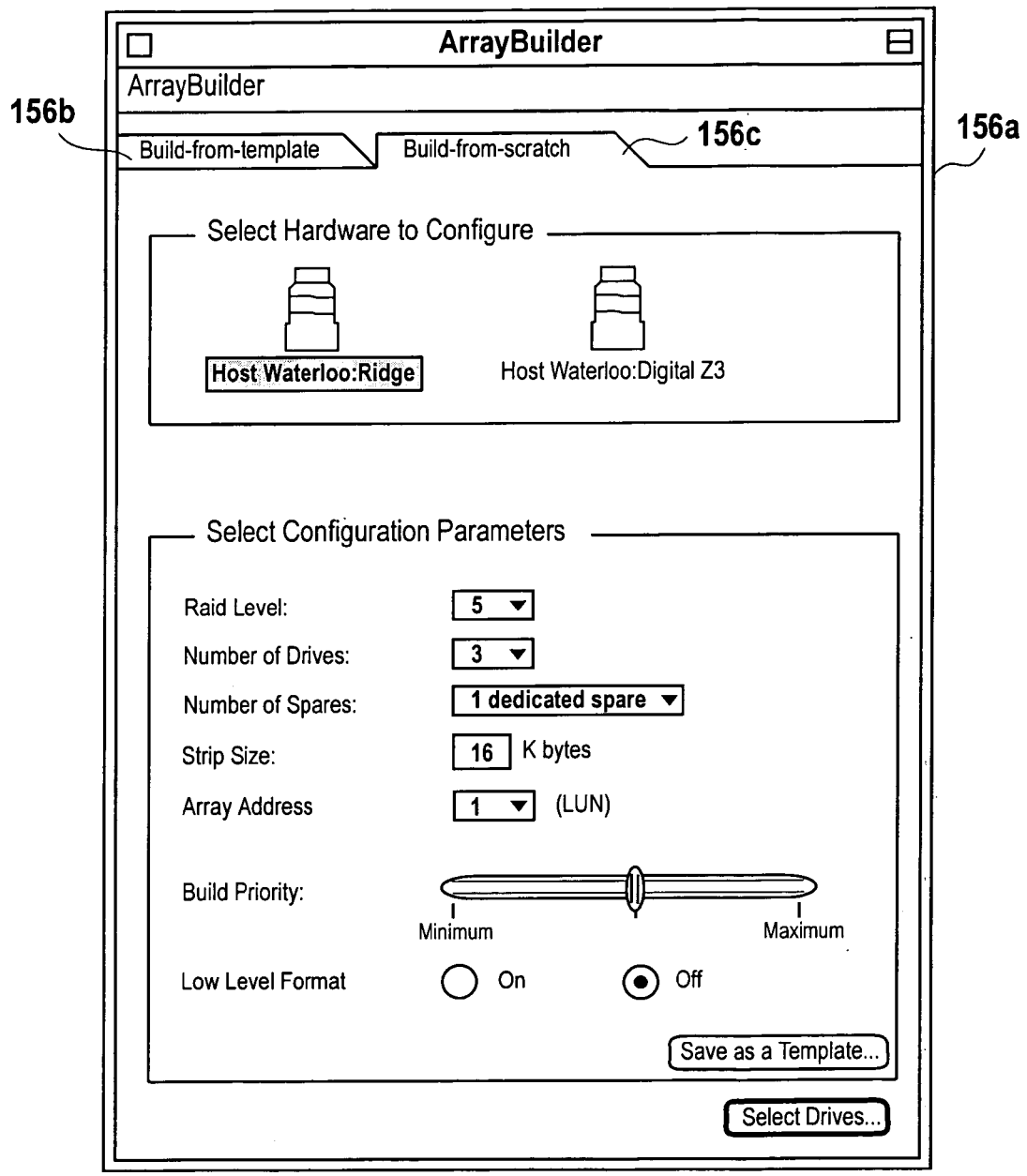

FIG. 27 illustrates an ArrayBuilder window 156a, through which a more experienced user can build an array from scratch. By way of example, a user is allowed to build an array for the selected subsystem "manually" by specifying each parameter. The window also shows a build-from template tab 156b and a build from scratch tab 156c. The top container in the window provides the user with a list of unconfigured subsystems. By clicking Select Drives, a user is allowed to specify the drives to be used for the array as shown in FIGS. 28 and 29.

FIG. 28 shows a select drives window 280, which allows a user to review the array specification and select specific drives before building the array. By clicking Build Array, the user can initiate the build process and can open a modeless progress window. Clicking Show Details reveals more array specification parameters as shown in FIG. 29.

Figure 29:
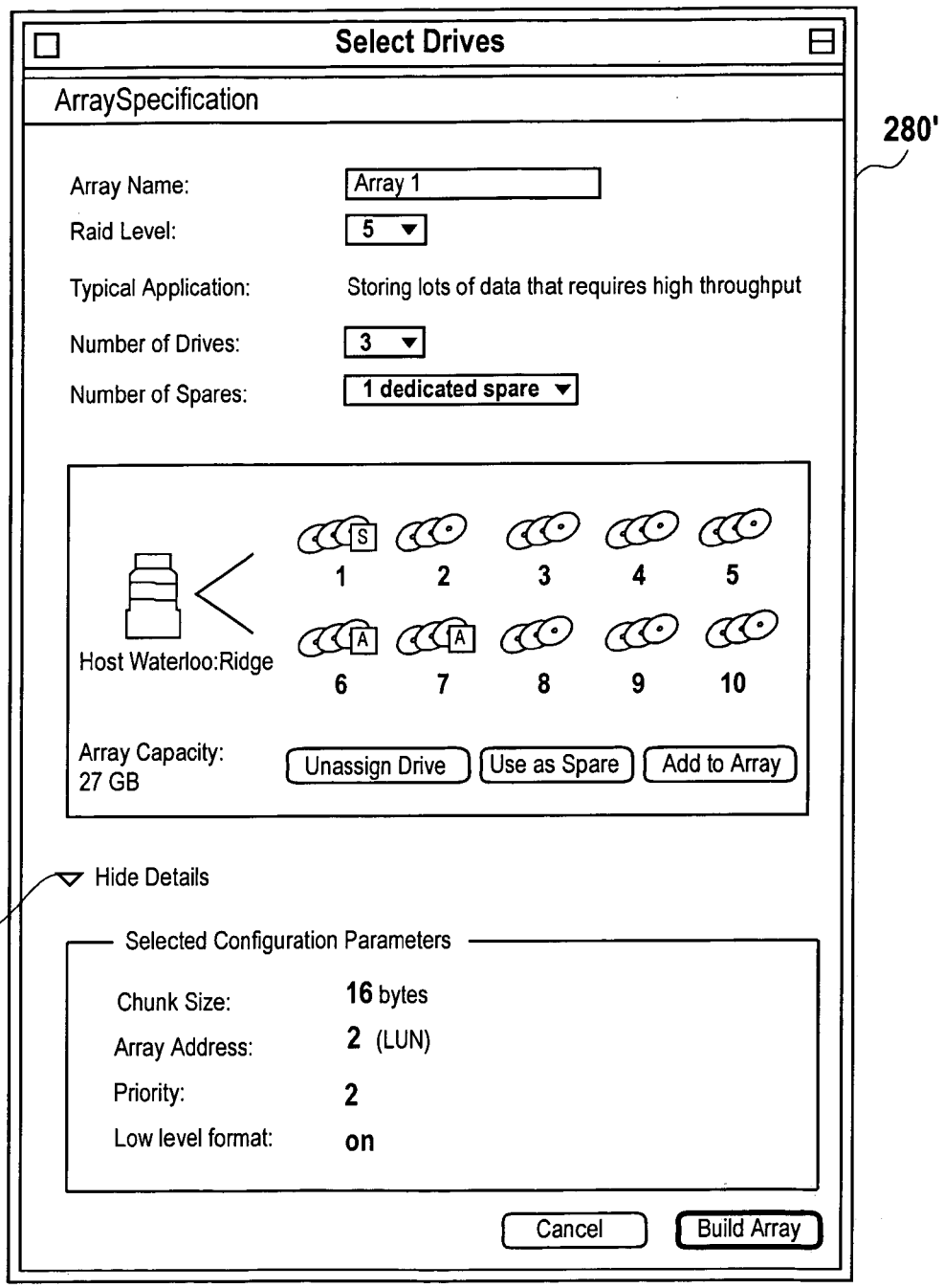

FIG. 29 shows a select drives window 280', with details 181 shown. In this embodiment, the users are allowed to review the array specification and select specific drives before building the array. Clicking Build Array initiates the build process and opens a modeless progress window. Clicking Hide Details hides the detailed array specification parameters as shown in FIG. 28.

The invention employs various computer-implemented operations involving data stored in computer systems to drive software applications and hardware devices. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A storage area network management and configuration system, comprising:
    an enterprise network including a plurality of computer systems, the plurality of computer systems including server computer systems and client computer systems, wherein the server computer systems include a server component and the client computer systems include a client component;
    a storage enclosure connected to a server computer system having the server component, the storage enclosure having a RAID array of disks; and
    a graphical user interface provided by the client component at a client computer system, the graphical user interface being defined to enable a user to physically build and modify the RAID array of disks of the storage enclosure connected to the server computer system from the client computer system without requiring the user to locally interact with the server computer system.

2. A storage area network management and configuration system as recited in claim 1, further comprising:
    an array modifier tool configured to allow online modification of a capacity and cache parameters of a disk array.

3. A storage area network management and configuration system as recited in claim 1, further comprising:
    an enterprise monitor tool configured to provide a window wherein monitoring settings can be set.

4. A storage area network management and configuration system as recited in claim 3, wherein the monitoring settings includes,
    a failure indicator; and
    a disk capacity indicator.

5. A storage area network management and configuration system as recited in claim 4, wherein the monitoring settings further include,
    a temperature indicator for the storage enclosure;
    a battery health indicator; and
    a power supply health indicator.

6. A storage area network management and configuration system as recited in claim 3, further comprising:
    an enterprise monitor window for providing a quick view of selected storage enclosure parameters.

7. A storage area network management and configuration system as recited in claim 1, further comprising:
an event notifier configured to provide customizable failure and status notifications associated with storage enclosures within the enterprise network.

8. A storage area network management and configuration system as recited in claim 7, wherein the customizable failure and status notifications include,
setting user notification profiles, the profiles include communication information.

9. A storage area network management and configuration system as recited in claim 8, wherein the communication information includes e-mail information and pager information.

10. A storage area network management and configuration system as recited in claim 1, further comprising:
an enterprise icon that when selected allows viewing of the enterprise network that includes the plurality of computer systems and associated storage enclosures that are connected to server computer systems having the server component.

11. A storage area network management and configuration system as recited in claim 10, wherein the viewing of the enterprise network can be of physical devices or logical devices, and the physical devices and the logical devices can be displayed in one of a tree view and a quick view.

12. A storage area network management and configuration system as recited in claim 11, further comprising:
a graphical failure representation provided for selected drives of the storage enclosure, the graphical failure representation being configured to be displayed on a failed drive when the failed drive is in a viewable setting and on the storage enclosure when the failed drive is not in the viewable setting.

13. A storage area network management and configuration system as recited in claim 1, wherein the client component provides a user administrator the management and configuration control to the storage enclosure of the enterprise network.

14. A storage area network management and configuration system as recited in claim 1, wherein the enterprise network can include a plurality of storage enclosures that are connected to selected computer systems that are part of the enterprise network and that have the server component.

15. A storage area network management and configuration system, comprising:
an enterprise network including a plurality of computer systems, the plurality of computer systems including server computer systems and client computer systems, wherein the server computer systems include a server component and the client computer systems include a client component;
a storage enclosure connected to a server computer system having the server component; and
a graphical user interface provided by the client component at a client computer system, the graphical user interface being defined to provide functional tools to enable a user of the client computer system to physically build a RAID array of disks either from scratch or through application of a RAID building template without requiring the user to locally interact with the server computer system.

16. A storage area network management and configuration system as recited in claim 15, wherein the functional tool to enable the user of the client computer system to build the RAID array of disks through application of a RAID building template, comprises:
a first container defined to enable selection of disks to be used in building the RAID array of disks, wherein the disks reside within a storage enclosure present within the enterprise network;
a second container defined to enable selection of the RAID building template that contains a RAID configuration scheme that is optimally selected for a particular storage application; and
code for dragging the selected RAID building template, that is in the form of an icon, over the selected disks or dragging the selected disks over the selected RAID building template, the dragging is configured to automatically apply the RAID configuration scheme.

17. A storage area network management and configuration system as recited in claim 16, wherein the RAID configuration scheme includes,
a RAID level;
a number of drives in the selected hardware;
a number of spare drives;
a stripe size; and
an array address.

* * * * *